US006663780B2

(12) United States Patent
Heikkila et al.

(10) Patent No.: US 6,663,780 B2
(45) Date of Patent: Dec. 16, 2003

(54) METHOD FOR THE FRACTIONATION OF MOLASSES

(75) Inventors: Heikki Heikkila, Espoo (FI); Jari Lewandowski, Kirkkonummi (FI); Hannu Paananen, Kantvik (FI); Jarmo Kuisma, Lohja as. (FI); Goran Hyoky, Askainen (FI); Kaj-Erik Monten, Lapinkyla (FI)

(73) Assignee: Danisco Finland Oy, Espoo (FI)

( * ) Notice: Subject to any disclaimer, the term of this patent is extended or adjusted under 35 U.S.C. 154(b) by 54 days.

(21) Appl. No.: 10/062,881

(22) Filed: Jan. 31, 2002

(65) Prior Publication Data

US 2003/0094416 A1 May 22, 2003

Related U.S. Application Data

(63) Continuation-in-part of application No. 09/736,071, filed on Dec. 13, 2000, which is a continuation of application No. 09/374,582, filed on Aug. 13, 1999, now Pat. No. 6,187,204, which is a continuation of application No. 08/925,903, filed on Sep. 9, 1997, now Pat. No. 6,093,326, which is a continuation of application No. 08/541,568, filed on Oct. 10, 1995, now abandoned, which is a continuation of application No. 08/187,421, filed on Jan. 25, 1994, now abandoned.

(30) Foreign Application Priority Data

Jan. 26, 1993 (FI) .................................................. 930321

(51) Int. Cl.[7] .............................................. B01D 15/08
(52) U.S. Cl. ...................... 210/659; 127/46.2; 127/46.3
(58) Field of Search ................................ 210/635, 656, 210/659, 198.2; 127/46.2, 46.3, 55, 58

(56) References Cited

U.S. PATENT DOCUMENTS 2,007,971 A    7/1935   Jackson ........................ 127/58
2,375,165 A    5/1945   Nees et al. ................... 260/534
2,519,573 A    8/1950   Hoglan ........................ 260/501

(List continued on next page.)

FOREIGN PATENT DOCUMENTS

| CA | 754511 | 3/1967 | ................. 210/659 |
| DE | 2 300 492 | 7/1973 | ................. 210/659 |
| DE | 23 62 211 | 6/1975 | ................. 210/659 |
| DE | 25 11 904 | 9/1976 | ................. 210/659 |
| DE | 40 41 414 A1 | 6/1991 | ................. 210/659 |
| EP | 0 010 769 A2 | 5/1980 | ................. 210/659 |

(List continued on next page.)

OTHER PUBLICATIONS

Dorfner, K., Ion Exchangers, Properties and Applications, Ann Arbor Science Publisher Inc. pp. 44–45 Undated.

Duolite C 464, Weak Acid Cation Exchange Resin, Feb. 1981, 3 pages.

Zaborsky, O., Immobilized Enzymes, CRC Press pp. 1–27 Undated.

(List continued on next page.)

Primary Examiner—Ernest G. Therkorn
(74) Attorney, Agent, or Firm—Kenyon & Kenyon

(57) ABSTRACT

The invention relates to a method for the fractionation of molasses using a chromatographic simulated moving bed system with two or more loops in which the liquid flow can be effected in a system comprising at least two chromatographic partial packing material beds. In the method of the invention, product(s) are recovered during a process comprising one or more of the following phases: a feeding phase of molasses, an eluting phase and a recycling phase. The liquid present in the partial packing material beds with their dry solids profile can be recycled in the recycling phase in one or more loops comprising one or more partial packing material beds.

150 Claims, 6 Drawing Sheets

U.S. PATENT DOCUMENTS

| | | | | |
|---|---|---|---|---|
| 2,524,414 | A | 10/1950 | Wolfrom et al. | 127/55 |
| 2,586,295 | A | 2/1952 | Brown et al. | 260/501 |
| 2,588,449 | A | 3/1952 | Young et al. | 127/30 |
| 2,684,331 | A | 7/1954 | Bauman | 210/24 |
| 2,818,851 | A | 1/1958 | Khym et al. | 127/55 |
| 2,845,136 | A | 7/1958 | Robinson | 183/2 |
| 2,868,677 | A | 1/1959 | Kopke | 127/46 |
| 2,890,972 | A | 6/1959 | Wheaton | 127/46 |
| 2,911,362 | A | 11/1959 | Wheaton | 210/31 |
| 2,937,959 | A | 5/1960 | Reents et al. | 127/46 |
| 2,949,389 | A | 8/1960 | Murtaugh et al. | 127/36 |
| 2,985,589 | A | 5/1961 | Broughton et al. | 210/34 |
| 3,021,374 | A | 2/1962 | Radzitzky | 260/631 |
| 3,044,904 | A | 7/1962 | Serbia | 127/46 |
| 3,044,905 | A | 7/1962 | Lefevre | 127/46 |
| 3,044,906 | A | 7/1962 | Lefevre | 127/46 |
| 3,134,814 | A | 5/1964 | Sargent et al. | 260/583 |
| 3,174,876 | A | 3/1965 | Stark | 127/46 |
| 3,214,293 | A | 10/1965 | Mountfort | 127/9 |
| 3,230,167 | A | 1/1966 | Golay | 210/31 |
| 3,250,058 | A | 5/1966 | Baddour et al. | 55/67 |
| 3,268,605 | A | 8/1966 | Boyd, Jr. | 260/666 |
| 3,298,527 | A | 1/1967 | Wright | 210/198 |
| 3,305,395 | A | 2/1967 | Scallet et al. | 127/30 |
| 3,374,606 | A | 3/1968 | Baddour | 55/67 |
| 3,398,512 | A | 8/1968 | Perkins, Jr. et al. | 55/386 |
| 3,407,574 | A | 10/1968 | Perkins, Jr. et al. | 55/386 |
| 3,411,342 | A | 11/1968 | Liermann | 73/53 |
| 3,416,961 | A | 12/1968 | Mountfort et al. | 127/46 |
| 3,420,709 | A | 1/1969 | Barrett, Jr. et al. | 127/53 |
| 3,436,897 | A | 4/1969 | Crowley | 55/67 |
| 3,453,811 | A | 7/1969 | Crowley | 55/386 |
| 3,468,607 | A | 9/1969 | Sloane et al. | 356/73 |
| 3,471,329 | A | 10/1969 | Quietensky et al. | 127/46 |
| 3,474,908 | A | 10/1969 | Catravas | 210/198 |
| 3,479,248 | A | 11/1969 | Nobile | 162/16 |
| 3,480,665 | A | 11/1969 | Nagy | 260/501.13 |
| 3,483,031 | A | 12/1969 | Lauer et al. | 127/41 |
| 3,493,497 | A | 2/1970 | Pretorius et al. | 210/31 |
| 3,494,103 | A | 2/1970 | Mir | 55/67 |
| 3,494,104 | A | 2/1970 | Royer | 55/67 |
| 3,513,023 | A | 5/1970 | Kusch et al. | 127/58 |
| 3,522,172 | A | 7/1970 | Pretorius et al. | 210/31 |
| 3,539,505 | A | 11/1970 | Lauer et al. | 210/31 |
| 3,558,725 | A | 1/1971 | Kohno et al. | 260/635 |
| 3,579,380 | A | 5/1971 | Friese | 127/37 |
| 3,586,537 | A | 6/1971 | Steiner et al. | 127/37 |
| 3,607,392 | A | 9/1971 | Lauer et al. | 127/15 |
| 3,619,369 | A | 11/1971 | Onishi et al. | 195/31 |
| 3,627,636 | A | 12/1971 | Jaffe et al. | 195/11 |
| 3,632,656 | A | 1/1972 | Unver | 260/635 R |
| 3,692,582 | A | 9/1972 | Melaja | 127/46 A |
| 3,694,158 | A | 9/1972 | Lauer et al. | 23/230 R |
| 3,704,168 | A | 11/1972 | Hara et al. | 127/58 |
| 3,730,770 | A | 5/1973 | Zievers et al. | 127/46 B |
| 3,732,982 | A | 5/1973 | Dunnill et al. | 210/198 C |
| 3,743,539 | A | 7/1973 | Kroyer et al. | 127/16 |
| 3,756,855 | A | 9/1973 | Duchateau et al. | 127/63 |
| 3,784,408 | A | 1/1974 | Jaffe et al. | 127/37 |
| 3,796,657 | A | 3/1974 | Pretorius et al. | 210/31 C |
| 3,814,253 | A | 6/1974 | Forsberg | 210/97 |
| 3,817,787 | A | 6/1974 | Hertzen et al. | 127/46 B |
| 3,826,905 | A | 7/1974 | Valkama et al. | 235/151.12 |
| 3,835,043 | A | 9/1974 | Geissler et al. | 210/31 C |
| 3,884,714 | A | 5/1975 | Schneider et al. | 127/46 B |
| 3,928,062 | A | 12/1975 | Yamauchi | 127/60 |
| 3,928,193 | A | 12/1975 | Maleja et al. | 210/31 |
| 3,959,519 | A | 5/1976 | Johnson | 426/648 |
| 3,982,003 | A | 9/1976 | Mitchell et al. | 426/1 |
| 4,001,112 | A | 1/1977 | Barker et al. | 210/31 C |
| 4,008,285 | A | 2/1977 | Melaja et al. | 260/635 |
| 4,066,711 | A | 1/1978 | Melaja et al. | 260/637 |
| 4,075,406 | A | 2/1978 | Melaja et al. | 536/1 |
| 4,096,036 | A | 6/1978 | Liu et al. | 195/31 F |
| 4,104,078 | A | 8/1978 | Barker et al. | 127/46 R |
| 4,143,169 | A | 3/1979 | Skoch et al. | 426/307 |
| 4,145,230 | A | 3/1979 | Madsen et al. | 127/60 |
| 4,182,633 | A | 1/1980 | Ishikawa et al. | 127/46 A |
| 4,208,284 | A | 6/1980 | Pretorius et al. | 210/65 |
| 4,213,913 | A | 7/1980 | de Rosset | 260/428.5 |
| 4,218,438 | A | 8/1980 | Callender et al. | 424/115 |
| 4,259,186 | A | 3/1981 | Boeing et al. | 210/198.2 |
| 4,366,060 | A | 12/1982 | Leiser et al. | 210/635 |
| 4,368,268 | A | 1/1983 | Gong | 435/161 |
| 4,391,649 | A | 7/1983 | Shimizu et al. | 127/46.2 |
| 4,404,037 | A | 9/1983 | Broughton | 127/55 |
| 4,405,455 | A | 9/1983 | Ando et al. | 210/191 |
| 4,412,366 | A | 11/1983 | Rock et al. | 16/236 |
| 4,426,232 | A | 1/1984 | Neuzil et al. | 127/46.3 |
| 4,451,489 | A | 5/1984 | Beale et al. | 426/254 |
| 4,471,114 | A | 9/1984 | Sherman et al. | 536/127 |
| 4,482,761 | A | 11/1984 | Chao et al. | |
| 4,498,991 | A | 2/1985 | Oroskar | 127/46.1 |
| 4,518,436 | A | 5/1985 | van der Poel | 127/60 |
| 4,519,845 | A | 5/1985 | Ou | 127/46.2 |
| 4,599,115 | A | 7/1986 | Ando et al. | 127/46.1 |
| 4,631,129 | A | 12/1986 | Heikkila | 210/635 |
| 4,636,315 | A | 1/1987 | Allen, Jr. | 210/656 |
| 4,666,527 | A | 5/1987 | Ito et al. | 127/60 |
| 4,724,006 | A | 2/1988 | Day | 127/30 |
| 4,732,687 | A | 3/1988 | Muller et al. | 210/656 |
| 4,837,315 | A | 6/1989 | Kukprathipanja | 127/46.1 |
| 4,857,642 | A | 8/1989 | Kulprathipanja | 536/127 |
| 4,873,111 | A | 10/1989 | Aaltonen et al. | 426/623 |
| 4,938,804 | A | 7/1990 | Heikkila et al. | 127/60 |
| 4,938,974 | A | 7/1990 | Bichsel et al. | 426/74 |
| 4,940,548 | A | 7/1990 | Zinnen | 210/656 |
| 4,955,363 | A | 9/1990 | Harju et al. | 127/46.1 |
| 4,970,002 | A | 11/1990 | Ando et al. | 210/659 |
| 4,976,865 | A | 12/1990 | Sanchez et al. | 210/635 |
| 4,980,277 | A | 12/1990 | Junnila | 435/2 |
| 4,990,259 | A | 2/1991 | Kearney et al. | 210/659 |
| 5,032,156 | A | 7/1991 | Luder et al. | 55/269 |
| 5,043,171 | A | 8/1991 | Bichsel et al. | 426/74 |
| 5,081,026 | A | 1/1992 | Heikkila et al. | 435/158 |
| 5,084,104 | A | 1/1992 | Heikkila et al. | 127/46.2 |
| 5,102,553 | A | 4/1992 | Kearney et al. | 210/659 |
| 5,122,275 | A | 6/1992 | Rasche | 210/659 |
| 5,124,133 | A | 6/1992 | Schoenrock | 422/191 |
| 5,127,957 | A | 7/1992 | Heikkila et al. | 127/47 |
| 5,156,736 | A | 10/1992 | Schoenrock | 210/264 |
| 5,177,008 | A | 1/1993 | Kampen | 435/139 |
| 5,198,120 | A | 3/1993 | Masuda et al. | 210/659 |
| 5,225,580 | A | 7/1993 | Zinnen | 554/30 |
| 5,382,294 | A | 1/1995 | Rimedio et al. | 127/42 |
| 5,384,035 | A | 1/1995 | Smolnik et al. | 210/635 |
| 5,387,347 | A | 2/1995 | Rothchild | 127/46.1 |
| 5,482,631 | A | 1/1996 | Saska et al. | 127/46.2 |
| 5,494,525 | A | 2/1996 | Heikkila et al. | 127/61 |
| 5,637,225 | A | 6/1997 | Heikkila et al. | 210/659 |
| 5,730,877 | A | 3/1998 | Heikkila et al. | 210/659 |
| 5,770,061 | A | 6/1998 | Heikkila et al. | 210/198.2 |
| 5,773,052 | A | 6/1998 | Virtanen et al. | 426/2 |
| 5,795,398 | A | 8/1998 | Hyoky et al. | 127/46.1 |
| 5,817,238 | A | * 10/1998 | Makino et al. | 210/659 |
| 5,851,405 | A | 12/1998 | Paananen | 20/724 |
| 5,858,424 | A | 1/1999 | Virkki | 426/54 |
| 5,922,924 | A | * 7/1999 | Hotier et al. | 585/479 |
| 5,932,016 | A | 8/1999 | Paananen | 127/48 |
| 5,948,950 | A | * 9/1999 | Hotier et al. | 585/828 |
| 5,951,777 | A | 9/1999 | Nurmi et al. | 127/61 |

| | | | | |
|---|---|---|---|---|
| 5,980,640 A | | 11/1999 | Nurmi | 127/60 |
| 6,005,153 A | * | 12/1999 | Zinnen et al. | 585/475 |
| 6,022,394 A | | 2/2000 | Paananen | 71/26 |
| 6,045,703 A | * | 4/2000 | Miller | 210/659 |
| 6,060,634 A | * | 5/2000 | Mikitenko et al. | 585/814 |
| 6,093,326 A | * | 7/2000 | Heikkila et al. | 210/659 |
| 6,147,272 A | * | 11/2000 | Mikitenko et al. | 585/812 |
| 6,187,204 B1 | * | 2/2001 | Heikkild et al. | 210/659 |
| 6,214,125 B1 | | 4/2001 | Hyoky | 127/46.1 |
| 6,224,776 B1 | | 5/2001 | Heikkila | 210/659 |
| 6,376,734 B1 | * | 4/2002 | Magne-Drisch et al. | 585/805 |
| 6,406,548 B1 | * | 6/2002 | Donovan et al. | 127/55 |
| 6,429,346 B2 | * | 8/2002 | Hotier et al. | 585/475 |
| 6,440,222 B1 | * | 8/2002 | Donovan et al. | 127/55 |
| 6,573,418 B2 | * | 6/2003 | Miller et al. | 585/826 |

FOREIGN PATENT DOCUMENTS

| | | | | |
|---|---|---|---|---|
| EP | 0 101 304 A2 | 2/1984 | | 210/659 |
| EP | 0 279 946 B1 | 8/1988 | | 210/659 |
| EP | 0 279 946 A2 | 8/1988 | | 210/659 |
| EP | 0 279 946 A3 | 8/1988 | | 210/659 |
| EP | 0 345 511 A3 | 12/1989 | | 210/659 |
| EP | 0 345 511 A2 | 12/1989 | | 210/659 |
| EP | 0 663 224 A1 | 7/1995 | | 210/659 |
| EP | 0 345 511 B1 | 8/1995 | | 210/659 |
| FI | 68526 | 6/1985 | | 210/659 |
| FI | 75503 | 3/1988 | | 210/659 |
| FI | 77845 | 1/1989 | | 210/659 |
| FI | 86416 | 5/1992 | | 210/659 |
| FI | 875655 | 6/1998 | | 210/659 |
| FR | 2641545 | 7/1990 | | 210/659 |
| GB | 715774 | 9/1954 | | 210/659 |
| GB | 1326765 | 4/1973 | | 210/659 |
| GB | 1 448 524 | 9/1976 | | 210/659 |
| JP | SHO 39-5429 | 4/1964 | | 210/659 |
| JP | 45-24834 | 8/1970 | | 210/659 |
| JP | 61-063291 | 4/1986 | | 210/659 |
| JP | 62-104588 | 5/1987 | | 210/659 |
| JP | 64-080409 | 3/1989 | | 210/659 |
| JP | 02-124895 | 5/1990 | | 210/659 |
| JP | 60-145095 | 7/1995 | | 210/659 |
| RU | 4614225/13 | 2/1980 | | 210/659 |
| SU | 445270 | 6/1976 | | 210/659 |
| SU | 1072818 A | 2/1981 | | 210/659 |
| WO | WIPO 81/00014 | 9/1981 | | 210/659 |
| WO | WO 81/02420 | 9/1981 | | 210/198.2 |
| WO | WO 81/02420 | 6/1982 | | 210/659 |
| WO | WIPO 82/00712 | 12/1982 | | 210/659 |
| WO | WO 82/04265 | 12/1982 | | 210/198.2 |
| WO | WO 88/05467 | 7/1988 | | 210/659 |
| WO | WO 90/06796 | 6/1990 | | 210/659 |
| WO | WO 90/08193 | 7/1990 | | 210/659 |
| WO | WO 91/08815 | 6/1991 | | 210/659 |
| WO | WO 94/17213 | 8/1994 | | 210/659 |
| WO | WO 98/30724 | 7/1998 | | 210/659 |
| WO | WO 98/32514 | 7/1998 | | 210/659 |
| ZA | 32855 ZA | 2/1998 | | 210/659 |

OTHER PUBLICATIONS

Sax, N. and Lewis, Sr., R., Acid Butyl Phosphate, Hawley's Condensed Chemical Dictionary, $11^{th}$ ed., pp. 15 and 893 Undated.

Morrison, R. and Boyd, R., Organic Chemistry, $5^{th}$ ed., pp. 833–839 Undated.

Allenza, P., Scherl, D., and Detroy, R., Hydrolysis of Xylan by an Immobilized Xylanase from *Aureobasidium pullulans*, Biotechnology and Bioengineering Symp. No. 17 (1986) pp. 425–433.

Jenq, C.Y., Wang, S.S. and Davidson, B., Ultrafiltration of Raw Sewage Using An Immobilized Enzyme Membrane, Enzyme Microb. Technol., Apr. 1980, vol. 2, pp. 145–147.

Decker, Robert F.H., Bioconversion of Hemicellulose: Aspects of Hemi–cellulase production by *Trichoderma reesea* QM 9414 and Enzyme Saccharification of Hemicellulose, Abstract 177464d, Chemical Abstracts, vol. 98, 1983.

Weckstrom, L. and Leisola, M., Enzymatic hydrolysis ofHemicellulose From Bisulphite Waste, pp. 21–26 and Abstract $96:124760_z$, Wood Products, vol. 96, 1982.

Poutanen, K. and Puls, J., Enzymatic hydrolysis of Steam–Prepared Lignocellulosic Materials, Third European Congress on Biotechnology, vol. II, Sep. 1984, pp. 217–223.

International Preliminary Examination Report for PCT/FI91/00011 Apr. 1990.

International Search Report for PCT/FI90/00015 Apr. 1990.

Hyrkas et al., Heran Laktoosin Hydrolyysi Immobilisoidulla β–Galaktosidaasilla, 1974, pp. 38–47.

Dialog Information Services, File 351, WPI 81–90, Dialog Accession No. 88–297740/42, Horitsu H: Sugar Alcohol Prepn. by Treating mixed Sugar Soln. Cong. Substrate Sugar and Hydrogen Donor Sugar With Candida Yeast Undated.

Amaral–Collaco, et al., Utilization of the Hemicellulosic Fraction of Agro Industrial Residues by Yeasts, see p. 449, abstract 34371t, & Enzyme Syst. Lignocellul. Degrad., 1989, pp. 221–230.

Onishi et al., The Production of Xylitol, L–Arabinitol andRibitol by Yeasts, Agr. Biol.Chem., vol. 30, No. 11, 1996, pp. 1139 and 1144.

Chemical Abstracts, vol. 105, No. 5, Aug. 4, 1986, (Columbus, Ohio, US), J. C. Du Preez et al.: "Xylose fermentation by *Candida shehatae* and *Pichia stipitis*: effects of pH, temperatue and substrate concentration", see p. 604, Abstract 41196y, & Enzyme Microb. Technol., 8 (6), 360–364 (1986).

Chemical Abstracts, vol. 112, No. 5, Jan. 29, 1990, (Columbus, Ohio, US), M.T.Amaral–Collaco et al.: "Utilization of the hemicellulosic fraction of agro–Industrial residues by yeasts", see page 449, Abstract 34371t, & Enzyme Syst. Lignocellul. Derad., 221–230 (1989).

Chemical Abstracts, vol. 114, No. 5, 4, Feb. 1991, (Columbus, Ohio, US), K.B. Taylor et al.: "The fermentation of xylose: studies by carbon–13 nuclear magnetic resonance spectroscopy", see page 592, Abstract 41014y, & J. Inc. Microbiol., 6 (1), 29–41 (1990).

Chemical Abstracts, vol. 98, No. 9, Feb. 28, 1983, (Columbus, Ohio, US), Gong, Cheng Shung et al.: "Conversion of pentoses by yeasts", see p. 484, Abstract 70314c, & Biotecnol. Bioeng., 25 (1), 85–102 (1983).

Publication: "*Biotechnological Production of Xylitol. Part 3: Operation In Culture* Media Made From Lignocellulose Hydrolysates", by Juan Carlos Parajo, Herminia Domiquez & Jose Manuel Dominguez of Department of Chemical Engineering, University of Vigo, Ourense, Spain, published by *Bioresource Technology* 66 (1998), pp. 25–40.

Publication: "Fermentation of Lignocellulosic Hydrolysates For Ethanol Production", by Lisbeth Olsson and Barbel Hanh Hagerdal of Applied Microbiology, University of Lund/Lund Institute of Technology, Lund Sweden, published by *Enzyme and Microbial Technology* 18: pp. 312–331, (1996).

Publication: "*Alternative Sweeteners Second edition, revised and Expanded*", by Albert Bar, Bioresco Ltd., Brussels, Belgium, edited by Lyn O'Brien Nabors and Robert C. Gelardi of Calorie Control Council, Atlanta, Georgia, published by Marcel Dekker, Inc. pp. 349–379 (1991).

Publication: "*Third European Congress On Biotechnology*", by Weinheim presented in Muchen, Federal Republic of Germany, vol. II (Sep. 10–14, 1984).

Publication: "*Chromatography of Oligosaccharides and Related Compounds on Ion–Exchange Resin*" by Department of Engineering Chemistry, Chalmers University of Technology,Goteborg, Sweden, Advances in Chromatography, vol. 16, pp. 113–149 (1978).

Publication: "The Distribution of Polyalcohols Between Organic Ion Exchangers and Water" by Malte Mattisson and Olof Sameulson, Department of Engineering Chemistry, Chalmer Tekniska Hogskola, Goteborg, Sweden, No. 7, pp. 1386 1394 (1958).

Publication: "*Ion–Exchange Chromatography of Aldehydes, Ketones, Ethers, Alcohols, Polyols and Saccharids*" published in Journal of Chromatographprinted by Chromatographic Reviews,Elsevier Scientific Publishing Company, Amsterdam Printed in The Netherlands, 98 pages 55–104 (1974).

Publication: "*Xylitol dehydrogenase from Pachysolen tannophilus*" by G. Ditzelmuller, C.P.Kubicek, W. Wohrer and M. Rohr of Institute for Biochemische Technologie and Mikrobiolgies, Wien, Austria, pp. 195–198 (Jul. 31, 1984).

Publication: "*Fermentation of Cellulose and Hemicellulose Carbohydrates by Thermotolerant Yeasts*" by Linda D. McCracken and Cheng–Shung Gong ofLaboratory of renewable Resources Engineering, A.A. Potter Engineering Center, Purdue University, West Lafayette, Indiana, published by Biotechnology and BioengineeringSymp. No. 12, 91–102 (1982).

Publication: "*Conversion of D–Xylose IntoXylitol By Xylose Reductase From Candida pelliculose Coupled With the Oxidoreductase System of Methanogen Strain HU*"by V. Kitpreechavanich of Department of Microbiology, M.Hayasi, N. Nishio and S. Hagai of Department of Fermentation Technology, published Biotechnology Letter,vol. 6, No. 10, pp. 651–656 (1984).

Publication: "*Quantitative Production of Xylitol From D–Xylose By A High–Xylitol Producing Yeast Mutant Candida tropicalis HXP2*" by Cheng–Shung Gong, Li Fu Chen and Georg T.Tsao of Laboratory of Renewable Resources Engineering, A.A. Potter Engineering Center, Purdue University, West Lafayette, Indiana, published in Biotechnology Letters vol. 3 No. 3. pp. 130–135 (1981).

Publication "*Sugar*" by Encyclopedia Britannica, Britannica.com, pp. 1–8 (2000).

Publication "*II.F.2—Sugar*" by The Cambridge World History of Food, pp. 1–20 (at least as early as Feb. 2001).

Publication "*US Sugarbeet Industry and Biotechnology*" Beet sugar Development Foundation, United States Beet Sugar Association and American Sugarbeet Growers Association, by AG Issues, American Crystal Sugar Company, pp. 1–9 (at least as early as Feb. 2001).

Publication: "*pH Control in the Sugar Mill*" byJorgi M. Day, ChE, presented at Instrument Society of American Puerto Rico Section, San Juan, Puerto Rico, pp. 1–21 (Mar. 1996).

Publication: "*Outlook For Emerging Technologies In Sugar Processing*", by Stephen J. Clarke, of Florida Crystals Corporation, Palm Beach, Florida, published by *Agricultural Outlook Forum*, pp. 1–9 (Feb. 23, 1999).

Publication: "*Processing Sugar from Sugar Beets*", by Dr. Mosen Asadi, Director of Research, published by Monitor Sugar Company: A Guide for Student and Chemists, pp. 1–5 (at least an early as Feb. 2001).

Publication: "*The History of Sugar in a Swedish Perspective*"by Danisco Sugar, in Dictionary of Sweeteners, pp. 1–5 (at least as early as Feb. 2001).

Publication: "*XYLITOL: Technology & Business Opportunities*"by Soumitra Biswas and Nirmala Vashishtha, published in *News and Views*, pp. 1–10 (at least as early as Feb. 2001).

Abstract: "Enzymatic Removal and Ulitization of Hemicellulose from Pulps" by Jeffries, TW, published in *Abstracts of Papers, Am. Chem. Soc. 200$^{th}$ ACS National Meeting*, Cell 55, 1990.

Publication: "Shifting Product Formation FormXylitol to Ethanol in Pentose Fermentation with the*Candida tropicalis* by Altering Environmental Parameters" by Elke Lohmeier–Vogel, Birgitta Jõnsson and Bãrbel Hahn–Hãgerdal, published in *Annals New York Academy of Science*, vol. 434, pp. 152–154, 1984.

"*Making Waves In Liquid Processing—Advanced Technology In Liquid Process*" Illinois Water Treatment Company, published by *New Technology: IWT ADSEP™ System*, vol. 1NC, Mar. 4, 1983.

Minute Order of May 12, 2003 in the Illinois litigation captioned *Finnsugar Bioproducts, Inc. v. The Amalgamated Sugar Company*, LLC. et al., Civil Action No. 97 C 8746 (N.D.Ill).

Order of Stipulated Dismissal of May 9, 2003 in the Michigan litigation captioned *Finnsugar Bioproducts, Inc. v. Monitor Sugar Company*, Civil Action No. 00–10381 (E.D. Mich.).

"*Proceedings Of The Research Society Of Japan Sugar Refineries' Technologists*", edited by The Research Institute Of The Japan Sugar Refiners' Association, vol. 27, Aug., 1977.

"*Purification Of Sugar Products By The Ion Exclusion Process*" by D. Gross of Tate & Lyle, Ltd., Research Centre, Keston, Kent, England; presented to the 14$^{th}$ General Assembly, C.I.T.S, Brussels, 1971.

Processing Equipment: "*High–volume chromatography separates the 'hard to separate' organic Compounds*", *Food Engineering*, May, 1983.

"*Simultaneously Continuous Separation of Glucose, Maltose, and Maltotriose Using a Simulated Moving–Bed Adsorber*" by Kyu Beom Kim, Shiro Kishihara, and Satoshi Fujii of The Graduate School of Science And Technology, Kobe University, I, Rokkadai, Nada–ku, Kobe 657, Japan Received Sep. 2, 1991.

Chromatographic Separation: "*A Sequential Chromatographic Process for the Separation of Glucose/Fructose Mixtures*", by P. E. Barker, C. H. Chuah of the Chemical Engineering Department, University of Aston in Birmingham, Gosta Green, Birmingham, *The Chemical Engineer*, (Aug./Sep. 1981), pp. 389–393.

"*On The Utilization Of Betaine From Sugar Beets*" by J.P. Dubois, Raffinerie Tirlementoise, s.a., D–3300 Tienan (Belgium) Undated.

S.I.T. Paper #649: "*An Audubon Sugar Institute–Applexion Process For Desugarization Of Cane Molasses*", by M. Saska, Ch. Pelletan, Mei Di Wu and X. Lancrenon, presented at the 1993 Sugar Industry Technologists Meeting, Jun. 13–16, 1993, Toronto Ontario.

S.I.T. Paper #428: "*Liquid Sugar From The Chromatographic Molasses Desugarization Process*" by H. J. Hongisto, Finnish Sugar Co., Ltd., Kantvik, Finland, vol. XXXVIII, Publication of Technical Papers and Proceedings of the 38th Annual Meeting of Sugar Industry Technologists, Inc, Boston, Massachusetts, May 6–9, 1979.

"*Desugarisation of Cane Molasses By the Finnsugar Chromatographic Separation Process*", By H. Hongisto and H. Heikkila, reprint ISSCT (1997).

"*Beet Sugar*" by Michael Cleary of Imperial Holly Coporation appearing in Kurk–Othmer, *Encyclopedia Of Chemical Technology*, Fourth Edition, vol. 23, published by John Wiley & Sons, Wiley–Interscience (1997).

Process Technology: "*Separating Sugars And Amino Acids With Chromatography*", by Heikki Heikkila, Finnish Sugar Co., Ltd., *Chemical Engineering* Jan. 24, 1983, pp. 50–52.

"*Trends In The Chromatographic Separation Of Molasses*", by Hannu A. Paananen, *Zuckerind 122* (1997) Nr. 1, pp. 28–33.

"*Engineering Analysis Of Ion Exclusion For Sucrose Recovery from Beet Molasses, Part 1 Experimental Procedures And Data Reduction Techniques*" by W.G. Schultz, J. B. Stark and E. Lowe, Western Regional Research Laboratory, Western Utilization Research And Development Division, Agricultural Research Service, U.S. Department of Agriculture, Albany, California, 94710 U.S.A., published in the International Sugar Journal, Feb., 1967.

"*Engineering Analysis Of Ion Exclusion For Sucrose Recovery From Beet Molasses, Part II Data Analysis And Cost Projection*" by W.G. Schultz, J. B. Stark and E. Lowe, Western Regional Research Laboratory, Western Utilization Research And Development Division, Agricultural Research Service, U.S. Department of Agriculture, Albany, California, 94710 U.S.A., published by the International Sugar Journal, Apr., 1967.

S.I.T. Paper 373: "*The Recovery Of Sugar From Beet Molasses By Ion Exclusion*", by James F. Zieverz and C. J. Novotny, Industrial Filter & Pump Mfg. Co., Cicero, Illinois Undated.

"*Recovery Of Sugar From Beet Molasses*" By The P. & L. Exclusion Process, by H.G. Schneider and J. Mikule of Pfeifer & Langen, Euskirchen, Germany, published in the International Sugar Journal, Part I, pp. 259–264, Sep. 1975.

"*Recovery Of Sugar From Beet Molasses by The P. & L. Exclusion Process*", by H.G. Schneider and J. Mikulse of Pfeifer & Langen, Euskirchen, Germany, published in the International Sugar Journal, Part II, pp. 294–298, Oct., 1975.

Chromatographic Separation of Sugar Solutions: "*The Finnsugar Molasses Desugarization Process*", Part II, by H. J. Hongisto, Technical Department, Finnish Sugar Compnay, Ltd., Kantvik, Finland, published by the *International Sugar Journal*, May 1977, pp. 132–134.

"*Trends In The Chromatographic Separation Of Molasses*", by Hannu A. Paananen of Cultor Ltd., Finnsugar Bioproducts, Helsinki, Finland, Proceedings of the Workshop on Separation Process in the Sugar Industry, New Orleans, Apr., 1996, pp. 100–119.

Ari: "*Coupled Loop Chromatography*" by Mike Kearney of Amalgamated Research, Inc., Presented at the $29^{th}$ General Meeting, American Society of Beet Sugar Technologists, Mar. 1977.

"*Simulated Moving–Bed Technology In The Sweetener Industry*", by D. Eugene Rearick, Michael Kearney, and Dennis D. Costesso of Amalgamated Research, Inc., published in *Chemtech*. vol. 27, No. 9, pp. 36–40 Undated.

"*Desugarisation Of Beet Molasses By the Finnsugar Chromatographic Separation Process*", by H. Hongisto, Finnsugar Engineering Undated.

SPRI: "*Trends In The Chromatographic Separation of Molasses*", by Hannu A. Paananen of Cultor, Ltd., Finnsugar Bioproducts, Helsinki, Finland, presented at the Proceedings of the 1996 Workshop on Separation Process in the Sugar Industry 1996.

"*The Recovery Of Sugar From Beet Molasses By the P. & L. Exclusion–Process*", by H. G. Schneider and J. Mikule of Pfeifen & Lange, Euskirchen, Germany Undated.

"*Engineered Fractal Cascades For Fluid Control Applications*" by Mike Kearney of Amalgamated Research, Inc., Twin Falls, Idaho Undated.

"*Contral Of Fluid Dynamics With Engineered Fractal Cascades–Adsorption Process Applications*", by Mike Kearney, Director, New Technology, Amalgamated Research Inc., Twin Falls Idaho 1997.

"*Molasses Exhaustion Session*", Keynote Speech Summary, by Mike Kearney, Director, New Technology, Amalgamated Research Inc., published by *British Sugar EuroTechLink 97, England* Undated.

"*Multicomponent Separation Using Simulated Moving Bed Chromatography*", by V. Kochergin and M. Kearney of Amalgamated Research, Inc., presented at AIChE Annual Meeting, Los Angeles, Nov. 16–21, 1997, Novel Adsorption–Based Separation Equipment Configuration, AIChE Proceedings, Part 2, pp. 1539–1544.

"*Molassesdesugarization with Liquid Distribution Chromatography*", by Dr. Mohammad Munir, Zentral–Laboratorium dor Suddautschen Zucker–Aktiengesollschaft, presented at $15^{th}$ General Assembly of Commission Internationale Technique de Sucrerie, Vienna, Austria, May 12–16, 1975.

"*Ion Exclusion . . . an overlooked ally*", by James F. Zievers, C. J. Novotny, and E. A. Selvick of Industrial Filter and Pump Mfg. Co., Cicero, Illinois, published in *The Sugar Journal*, Feb., 1972, pp. 7–10

"*Ion Exchange For Desurgaring Of Molasses And Byproduct Isolation*", by L.H. Ramm–Schmidt, published by B.V. Amsterdam, 1988, printed in Netherlands, pp. 111–126 Undated.

"*Applications Of The Finnsugar–Pfiefer & Langen Molasses Desugarisation Process In A Beet Sugar Factory*", by H. J. Hongisto and P. Laakso Undated.

"*The Removal Of Color From Sugar Solutions By Adsorbent Resins*", by R. I. M. Abrams, Technical manager of Duplite Ion Exchange Resins, Diamond Shamrock Chemical Company, Redwood City, California, published in *Sugar y Azuca*, 1971, pp. 31–34.

"*Simulated Moving Bed Technology Applied To The Chromatographic Recovery Of Sucrose From Sucrose Syrups*", by Mike Kearney of The Amalgamated Sugar Company, Twin Falls, Idaho, presented at Conference on Sugar Processing Research, Fiftieth Anniversary Conference, San Francisco, California, May 29—Jun. 1, 1990.

Ion Exclusion– An Overlooked Ally: "*Ion Exclusion Experiments*", by James F. Zievers, C. J. Novotny, and E. A. Selvick of Industrial Filter and Pump Mfg. Co., Cicero, Illinois, Oct. 4, 1970, pp. 12–24.

"Separation Process in the Sugar Industry". Proceedings of S.P.R.I. Workshop on Separation Processes in the Sugar Industry, Edited by Margaret A. Clarke. Sugar Processing Research Insitute Inc., New Orleans, LA Oct., 1996.

"New Development In The Chromatographic Desugarisation Of Beet Molasses", by Francois Rouseet, Applexion, France, published by British Sugar EuroTechLink 97, York England Undated.

"Chromatographic Separation Of Sugar Solutions The Finnsugar Molasses Desuragization Process", By H. J. Hongisto, Technical Department, Finnish Sugar Company, Ltd., Kantvik, Finland, presented to the 23$^{rd}$ Tech. Conf., British Sugar Corp. Ltd, 1976, Part I published in *International Sugar Journal*, Apr. 1977, pp. 100–104.

"Chromatographic Separation Of Sugar Solutions The Finnsugar Molasses Desugarization Process", by H. J. Hongisto, Technical Department, Finnish Sugar Company, Ltd., Kantvik, Finland, presented to the 23$^{rd}$ Tech. Conf., British Sugar Corp. Ltd, 1976, Part II published in *International Sugar Journal*, May 1977, pp. 131–134.

"Ion Exclusion Purification Of Sugar Juices", by Lloyd Norman, Guy Rorabaugh, and Harold Keller, Research Laboratory Manger and General Chemist, Director of Research, Holly Sugar Corporation and Assistand Director, Illinois Water Treatment Company, published by Journal of A. S. S. B. T., vol. 12, No. 5, Apr., 1963, pp. 362–370.

"Chemical Educators Stress Industry Ties" by Ward Worthy and Richard J. Seltzer of C&EN Washington, published Oct. 6, 1975, *C&EN*.

"Adsorption Separates Xylenes" by Seiya Otani of Toray Industries, Inc., published by *Chemical Engineering*, Sep. 17, 1973.

"Designing Large–Scale Adsorptive Separations" by E.N. Lightfoot, S.J. Gibbs, A.M. Athalye and T.H. Scholten of Department of Chemical Engineering, University of Wisconsin, Madison, WI., published *Israel Journal of Chemistry*, vol. 30, 1990, pp. 229–237.

"Continuous Chromatographic Separation Of Fructose/ Glucose" by Tetsuya Hirota of Mitsubishi Chemical Industries, Ltd., published *Sugar y Azucar* Jan. 1980.

"Mechanism Of The Separation Of Glucose And Fructose On A Strong–Acid Cation Exchanger" by Charles A. Sauer of Applications Development, Duolite International, Inc., a subsidiary of Diamond Shamrock Corporation, Apr. 23, 1981.

"High Purity Fructose Via Continuous Adsorptive Separation" by D.B. Broughton, H.J. Bieser, R.C. Berg, E.D. Connell, D.J. Korous, and R.W. Neuzil of UOP, Inc., published *La Sucrerie Belge*, vol. 96–May 1977, pp. 155–162.

"Large–Scale Chromatography: New Separation Tool" by R.S. Timmins, L Mir, and J.M. Ryan of Abcor, Inc., published by *Chemical Engineering*, May 19, 1969, pp. 170–178.

"The Tasco Chromatographic Separator At Twin Falls Factory", by K. P. Chertudi of The Amalgamated Sugar Company, published by *International Sugar Journal*, 1991, vol. 93, No. 1106.

"The Amalgamated Sugar Company Raw Juice Chromatographic Separation Process" by Mike Kearney and D. Eugene Rearick of The Amalgamated Sugar Company Research Laboratory, Twin Falls, Idaho, presented at 1995 C.I.T.S. 20$^{th}$ General Assembly, Munich, Germany, Jun., 1995.

"Production Of Raffinose: A New By–Products Of the Beet Sugar Industry" by K. Sayama, T. Kamada, and S. Oikawa of Nippon Beet Sugar Mgf Co Ltd., Japan, presented at British Sugar plc Technical Conference Eastbourne, 1992.

"Contribution To The Biochemistry And Use Of The Beet Constituent Betaine.," Von W. Steinmetzer 25 (1972) Nr. 2, pp. 48–57.

*Finnsugar Bioproducts, Inc. v. The Amalgamated Sugar Company, LLC*, et al., Civil Action No. 97–C–8746 (N.D. III.)—Answer and Counterclaims to the Amended and Supplement Complaint of the Amalgamated Sugar Company, LLC and Amalgamated Research, Inc. Undated.

Molasses Separation at SMSC, Feb. 18, 1991 (F43325–F43329).

Cultor Travel/Meeting Report *Preliminary Cost Estimate for Crystalline Betaine Production*, by Peter Norrman, Jun. 8, 1989 (F49931–F49936).

Cultor Ltd. Finnsugar Bioproducts *Visit Report*, by Kaj–Erik Monten, Jul. 15, 1991 (F36461–F36469)..

SMBSC/Cultor Joint Research Project, *Research Schedule*, for Mar.–Jun. 1993 by Goran Hyoky updated Mar. 17, 1993 pp. 1–3.

Finnsugar Report, *Betaine Separation in Renville Preliminary Investment Costs*, by Peter Norrman, Mar. 7–8, 1993 (F44079–F44082).

Technical Report 8: *Alternative Separation Methods* by Goran Hyoky, Jan. 21, 1994 pp. F45083–F45093.

*Some Technical and Economic Aspects of The Chromatographic Separation of Sugar Solutions* by H. Hongisto, Finnish Sugar Company Ltd. presented to British Sugar Corporation Ltd. 23$^{rd}$ Technical Conference in Eastbourne, Jun. 1976 pp. F004309–F004334.

*Large–Scale Adsorption and Chromatography*, vol. I, by Phillip C. Wankat, published by CRC Press, Inc., pp. 1–5, 1986.

*Large–Scale Adsorption and Chromatography*, vol. II, by Phillip C. Wankat, published by CRC Press, Inc., pp. 1–113. 1986.

*Ion Exclusion Purification of Molasses* by J.B. Stark, 1964 pp. A014923–A014933.

*Purolite Chromatographic Ion–exchange Resins* Undated pp. 1–5.

Southern Minnesota Beet Sugar Cooperative *Separation Process Training* by Goran Hyoky, Feb. 1992 (F37933–F37985).

Cultor Ltd. *Operation Manual* for the Cultor/Finnsugar Molasses, Southern Minnesota Beet Sugar Cooperative, by Goran Hyoky and Esko Varteva, Nov. 6, 1989, as revised Jul. 20, 1992, (Zitterkopf Exhibit 3) (F44355–F44397).

Cultor Ltd. *Separation Program*, One Step Separation Sequence in SMS, Two Step Separation Sequence for Western Sugar, By Jarmo Kuisma, May 25, 1993 (Hyoky Exhibit 15) (F45859–F45892).

Cultor Ltd. *Program for New Looping* by Goran Hyoky, May 8, 1992 (Hyoky Exhibit 16) (F44085–F44086).

Cultor Ltd. *Program for New Looping* (*Two Phase Process*) by Goran Hyoky, Jul. 8, 1992 and cover letter (Hyoky Exhibit 17) (F44273–F44274).

*Molasses and Betaine SMB Separtion Daily Material Balance*, accompanied by Charts: *Betaine Separation In Renville, Preliminary Investment Cost*, by Peter Norrman of Finnsugar Ltd., Mar. 7, 1993, with cover letter of Mar. 8, 1993 (F36351–F36356 and F36360–F36363).

*Weekly Reports* 1/93—49/94 by Goran Hyoky for SMBSC/Cultor Joint Research Project, Mar. 18, 1993 through Feb. 13, 1994 (Zitterkopf Exhibit 5) (F45237–F45202).

*Technical Report 4/93* by Goran Hyoky for SMBSC/Cultor Joint Research Project, Aug. 13, 1993 (F45063–F45082).

*Technical Report 5/93* by Groan Hyoky for SMBSC/Cultor Joint Research Project, Sep. 28, 1993 (F38197–F38202).

*Technical Report 6/93* by Goran Hyoky for SMBSC/Cultor Joint Research Project, Oct. 28, 1993 (F45113–F45121).

Cultor Ltd. Finnsugar Bioproducts *Trip Report* Southern Minnesota Sugar Beet Cooperative by Kaj–Erik Monten, Apr. 23, 1993 with Diagram: *Molasses and Betaine SMB Separation Daily Material Balance* And Chart: *Betaine Separation at SMSC, Renville, Preliminary Calculation* by Kaj–Erik Monten, Apr. 10, 1993 (F36339–F36347).

*Research Program* updated May 17, 1993 with Research Schedule by Goran Hyoky for SMSBC/Cultor Joint Research Project (Hyoky Exhibit No. 3) (F035514–F035521).

SMSC *Certificate of Performance* with cover letter from Kaj–Erik Monten, Jun. 14, 1993 (Monten Exhibit No. 13) (F36555–F36557).

*Sucrose Fraction Polishing* by Goran Hyoky, Jun. 28, 1993 (Hyoky Exhibit No. 4) (F38220–F38231).

Cultor Ltd. *Research Plan* for SMB Separation Test/SMSC Betaine Fraction, by J. Rinne, Nov. 15, 1993 (F035414–F035415).

Finnsugar Development *Report* for SMB Separation Test/SMBSC Betaine Fraction, by Jukka Rinne, Dec. 24, 1993 (F035391–F035395).

Finnsugar Ltd. *Report* with schematic diagram of steps used in the SMSC betaine separation of the pilot scale SMB system; Chart of No Secondary Separation; Charts with Secondary Separation; Graph of Concentration Gradient; Tables of Test Runs; and Charts with Material Balances; by Jukka Rinne, Dec. 28, 1993 (F80090–F80102).

Finnsugar *Report* with charts, graphs, and diagram of steps used with the SMSC–betaine separation on the pilot scale SMB system, by Jukka Rinne, Dec. 28, 1993 (F80103–F80164).

Joint Research Report for Southern Minnesota Beet Sugar Cooperation and Cultor/Finnsugar Bioproducts, Inc., by Goran Hyoky and Jean–Pierre Monclin, Jan. 1994 (Kuisma Exhibit No. 7) (F36617–F36646).

Defendant's Response to Finnsugar's Interrogatories Regarding The '398 Patent dated Nov. 3, 1999 pp. 1–8.

Affirmative Expert Disclosure of Dr. Michael Cleary dated Sep. 21, 1999 pp. 1–17.

Rebuttal Expert Disclosure of Dr. Michael Cleary dated Oct. 12, 1999 pp. 1–18.

Defendant's ARI's Response to Finnsugar's Motion For Preliminary Injunction dated Jun. 1, 1999 pp. 1–15.

Rule 56.1(a)(3) Statement of Facts in Support of Defendants' Motion for Summary Judgment for Invalidity of the '398 Patent Under the §102(b) "On Sale" Bar dated Nov. 15, 1999 pp. 1–17.

Memorandum in Support of Defendants' Motion for Summary Judgment for Invalidity of the '398 Patent Under the §102(b) "On Sale" Bar dated Nov. 15, 1999 pp. 1–16.

Statement of Facts in Support of Defendant's Motion for Summary Judgment for Invalidity of the '398 Patent for Obviousness under §103 dated Nov. 15, 1999 pp. 1–8.

Memorandum in Support of Defendants' Motion for Summary Judgment for Invalidity of the '398 Patent for Obviousness under §103 dated Nov. 15, 1999 pp. 1–14.

"The Development and Application of Continuous Ion Exclusion" by Karl W.R. Schoenrock of the Amalgamated Sugar Company, presented to the 18th General Assembly Commission International De Sucrerie, Ferrara, Jun. 8–12, 1987.

Defendants' Reply in Support of Their Motion for Summary Judgment for Invalidity of the '398 Patent Under the §102(b) On Sale Bar. (Jan. 10, 2000).

Minute order and Memorandum Opinion and Order (Mar. 28, 2001).

Plaintiff's Memorandum in Support of Motion for Reconsideration of this Court's Decision of Mar. 28, 2001 Holding the '398 Patent Invalid, or in the Alternative, to Certify the Issue for Appeal. (Apr. 27, 2001).

Plaintiff's Notice of Recent Federal Circuit Decision Relevant to Plaintiff's Motion for Reconsideration of the Court's Decision of Mar. 28, 2001. (Jul. 9, 2001).

Defendant's Response to Plaintiff's Notice of Recent Federal Circuit Decision (Jul. 13, 2001).

Plaintiff's Memorandum in Support of its Renewed Motion for Reconsideration of this Court's Decision of Mar. 28, 2001 in View of the Federal Circuit's Decision in Group One, Ltd. v. Hallmark Cards, Inc. 254 F.3d 1041 (Fed. Cir. 2001), or in the Alternative, to Certify the Issue for Appeal. (Aug. 10, 2001).

Plaintiff's Supplemental Memorandum in Support of its Motion for Reconsideration of this Court's Decision of Mar. 28, 2001. (Sep. 14, 2001).

Defendant's Response to Plaintiff's Supplemental Memorandum in Support of its Motion for Reconsideration (Sep. 24, 2001).

Reply Memorandum in Support of Defendants' Motion for Summary Judgment of Invalidity of the '398 Patent for Obviosness under §103 on Jan. 10, 2000.

Minute order and Memorandum Opinion and Order (Mar. 26, 2002).

* cited by examiner

METHOD FOR THE FRACTIONATION OF MOLASSES

RELATED APPLICATIONS

This Application is a continuation-in-part (CIP) of U.S. Ser. No. 09/736,071 filed Dec. 13, 2000, which is a continuation of U.S. Ser. No. 09/374,582 filed Aug. 13, 1999, now U.S. Pat. No. 6,187,204 issued Feb. 13, 2001, which is a continuation of U.S. Ser. No. 08/925,903 filed Sep. 9, 1997, now U.S. Pat. No. 6,093,326 issued Jul. 25, 2000, which is a continuation of U.S. Ser. No. 08/541,568 filed Oct. 10, 1995, abandoned, which is a continuation of U.S. Ser. No. 08/187,421, filed Jan. 25, 1994, abandoned.

BACKGROUND OF THE INVENTION

The present invention relates to a method for the fractionation of molasses using a chromatographic simulated moving bed system comprising at least two chromatographic partial packing material beds.

Fractionation of molasses denotes fractionation of various vegetable-derived by-products of the food and fermenting industries, such as beet and cane molasses, stillage, vinasse, slop, wood molasses, corn steep water, wheat, barley and corn molasses (hydrolyzed C starch).

The simulated moving bed system (SMB) has been developed and introduced by UOP (United Oil Products), U.S.A., at, the beginning of the 1960's, initially for petrochemical applications (U.S. Pat. No. 2,985,589). Today several simulated moving bed methods for a number of different applications are known (U.S. Pat. Nos. 3,706,812, 4,157,267, 4,267,054, 4,293,346, 4,312,678, 4,313,015, 4,332,623, 4,359,430, 4,379,751, 4,402,832, 4,412,866, 4,461,649, 4,533,398 and 5,127,957, and published European application 0,279,946).

The simulated moving bed system enables separating performances that are many times higher, and dilution of the products (consumption of eluent) is lower than in the batch method.

The simulated moving bed method can be either continuous or sequential.

In a continuous simulated moving bed method, all flows are continuous. These flows are: feeding of feed solution and eluent liquid, recycling of liquid mixture and recovery of products (usually only two). The flow rate for these flows may be adjusted in accordance with the separation goals (yield, purity, capacity). Normally, 8 to 20 partial packing material beds are combined into a single loop. In accordance with the above-mentioned U.S. Pat. No. 4,402,832, the recycling phases have been applied to the recycling of e.g. non separated fraction and dilute fractions. The feed and product recovery points are shifted cyclically in the downstream direction. On account of the feed of eluent liquid and feed solution (and on account of recovery of products) and the flow through the packing material bed, a dry solids profile is formed. Ingredients having a lower migration rate in the packing bed are concentrated at the downstream end (back slope) of the dry solids profile, and respectively ingredients having a higher migration rate at the upstream end (front slope). Feeding points for feeding solution and eluent liquid and recovery points for product or products are shifted gradually at substantially the same rate at which the dry solids profile moves in the bed. The product or products are recovered substantially from the upstream and downstream end of the dry solids profile, and the feed solution is fed approximately to the maximum point of the dry solids profile and the eluent liquid approximately to the minimum point of the dry solids profile. Part of the separated product fraction is recycled on account of the continuous cyclic flow and as only part of the dry solids profile is removed from the packing material bed.

The cyclical shifting of the feed and recovery points can be performed by using feed and recovery valves disposed along the packing material bed at the upstream and downstream end of each partial packing material bed. If it is desired to recover product fractions of high purity, short phase times and a plurality of partial packing material beds must be employed (the apparatus has corresponding valves and feed and recovery equipment).

In a sequential simulated moving bed method, not all flows are continuous. In a sequential simulated moving bed method the flows can be: feeding of feed solution and eluent liquid, recycling of liquid mixture and recovery of products (two to four or more products; e.g. betaine as a third fraction in beet molasses separation and monosaccharides in cane molasses separation and lignosulphonates in spent liquor separation). The flow rate and the volumes of the different feeds and product fractions may be adjusted in accordance with the separation goals (yield, purity, capacity). The method comprises three basic phases: feeding, elution, and recycling. During the feed phase, a feed solution and possibly also an eluent liquid can be fed into predetermined partial packing material beds, and simultaneously two or even three product fractions can be recovered. During the eluting phase, eluent liquid can be fed into a predetermined partial packing material bed, and during said phases one or even two product fractions can be recovered in addition to the residue. During the recycling phase, no feed solution or eluent liquid can be fed into the partial packing material beds and no products can be recovered. The use of said phases is possible simultaneously in same or different beds.

Finnish Patent Application 882740 (U.S. Pat. No. 5,127, 957) discloses a method for recovery of betaine and sucrose from beet molasses using a sequential simulated moving bed method, the chromatographic system therein comprising at least three chromatographic partial packing material beds connected in series, in which method betaine and sucrose can be separated during the same sequence comprising: a molasses feeding phase, in which a molasses feed solution can be fed into one of said partial packing material beds and in which eluent water can be fed substantially simultaneously into another partial packing material bed, a feeding phase of eluent water, and a recycling phase, these phases being repeated either once or several times during the sequence.

U.S. Pat. No. 4,631,129 discloses the separation of sugars and lignosulphonates from a sulphite spent liquor by a process comprising two chromatographic treatments with ion exchange resins in different ionic forms. In the first treatment, the sulphite spent liquor is introduced into a chromatographic column comprising a strong acid cation exchange resin used as column packing material in metal salt form; the metal ion is preferably a metal ion of the spent liquor, usually calcium or sodium. A substantially sugarless fraction rich in lignosulphonates and a fraction rich in sugars are obtained from this column by elution. The latter fraction is subjected to a softening treatment, and its pH is adjusted to be in the range 5.5 to 6.5, whereafter it is introduced into the second chromatographic column containing resin in monovalent form, and a second fraction rich in sugars and a second fraction rich in lignosulphonates and salts are obtained therefrom by elution. It is stated in this patent that the process is capable of recovering sugars, e.g. xylose contained in hardwood sulphite spent liquor, in a very high purity and high yields. However, a drawback of the method of U.S. Pat. No. 4,631,129 is that the dry solids profile, which has been formed in the first chromatographic treatment and in which the components are already partly separated can be destroyed in the softening treatment and pH adjustment and thus may not be effectively utilized in the second chromatographic treatment. The method of U.S. Pat. No. 4,631,129 can be also complicated by the steps of concentration and additional pumping to which the solution is subjected. All of these factors add to investment costs. Furthermore, the method of U.S. Pat. No. 4,631,129 and many prior art chromatographic separation methods are attended by the drawback that they are typically batch methods and are not suitable for fractionating solutions on an industrial scale.

U.S. Pat. Nos. 4,008,285 and 4,075,406 teach recovery of xylose by a chromatographic method. In this method, a pentosan-containing biomass, e.g. wood raw material, is hydrolysed, the hydrolysate is purified by ion exclusion and colour removal and the resultant solution is fractionated chromatographically to obtain a solution rich in xylose. The fractionating methods disclosed in these patents are also batch processes, and only two product fractions are disclosed to be obtained thereby.

It is known that sucrose and betaine are recoverable from molasses by chromatographic separation. U.S. Pat. No. 4,395,430 describes a chromatographic method for the recovery of betaine from molasses by a batch process in which diluted molasses is fractionated with a polystyrene sulphonate exchange cation exchange resin in alkali metal form. In the method of U.S. Pat. No. 4,395,430 the betaine-enriched fraction obtained from a first fractionation is subjected to further chromatographic purification. However, the dry solids content in the sucrose and betaine fractions obtained by this method is relatively low and therefore, large amounts of eluent water usually need to be evaporated when recovering the sucrose and betaine from their respective fraction by crystallization.

U.S. Pat. No. 5,730,877 describes a method for fractionating a solution, such as sulphite cooking liquor, molasses, vinasse, etc., by a chromatographic simulated moving bed (SMB) method in which the liquid flow is effected in a system comprising at least two sectional beds in different ionic form. The liquid present in sectional packing material beds with its dry solids (dry substance) separation profile is recycled during the recycling phase in a loop. The dry solids separation profile from the first process phase can be retained and fed into the second process phase. This can have considerable benefit over many conventional two step processes where the dry solids separation profile is normally mixed in tanks between the columns.

German Patent DE 1 692 889 discloses recovery of xylose from sulphite spent liquor by a method in which the spent liquor is extracted with aliphatic alcohols containing 1 to 5 carbon atoms, the water and alcohol layers formed are separated, alcohol is removed from the latter by distillation, and the resultant syrup-like residue in which the ratio of xylose to lignosulphonates is at most 1:2.5, is maintained at a temperature below room temperature until the xylose is crystallized. The crystallized xylose is ground with ethanol, filtered, and dried. In this method, the lignosulphonates remain in the mother liquor with the salts. The drawback of the process is the recovery of solvents.

It is, therefore, desirable to provide an improved method to recover products from molasses.

BRIEF SUMMARY OF THE INVENTION

An improved method is provided to process molasses, such as: beet molasses, cane molasses, stillage, vinasse, wood molasses, biomass molasses, wheat molasses, barley molasses, corn molasses, and solutions derived from any of the preceding. The solutions derived from the molasses can comprise: raw juice, diffusion juice, thick juice, dilute juice, residual juice, molasses-containing liquid, or another molasses-containing juice. Advantageously, the improved method can produce a purer and/or better yield product.

The wood molasses and the biomass molasses can be derived from a xylan-containing vegetable material, such as: wood, hardwood as, birch, aspen, beech, eucalyptus, poplar, alder and alm, particulates of grain as straw, stems, hulls, husks, fibers, grains as wheat, corn, barley, rice, oat, corn cobs, bagasse, almond shells, coconut shells, cotton seed bran, cotton seed hulls, rice hulls, wood chips, and/or saw dust.

The biomass molasses can also comprise biomass hydrolysates. The biomass hydrolysates can be obtained by a process, such as: direct acid hydrolysis of biomass prehydrolysate obtained by prehydrolysis of biomass with steam or by enzymes, steam explosion of biomass, acid hydrolysis of prehydrolysate obtained by prehydrolysis of biomass with acetic acid, steam or enzymes, or spent liquor from pulping process such as a sulphite pulping process.

The wood molasses and the biomass hydrolysates can comprise: sulphite cooking liquor, spent sulphite pulping liquor, acid spent sulphite liquor, spent liquor from hardwood pulping, spent liquor from softwood pulping before or after hexoses are partially removed, spent liquor after ultrafiltration, spent liquor from digestion of biomass, spent liquor from hydrolysis of the biomass, spent liquor from solvent-based pulping, spent liquor from ethanol-based pulping, mother liquor from crystallization of xylose, diluted runoff of xylose crystallization from sulphite spent pulping liquor based solution, waste solution(s) from the paper industry, and/or from the pulping industry.

In one preferred method of this invention, at least one product is recovered during processing of molasses in two or more loops, i.e. at least a first loop and a second loop. Each loop comprises one or more chromatographic beds, columns, or parts thereof which are separate and distinct from the chromatographic beds, columns, and parts thereof in the other loop(s). The loops can be open or closed. A solution, liquid, or fraction from one loop can be transferred or passed to another loop when the loops are open. The system of the preferred method can comprises one to twelve chromatographic columns. Each loop can comprise a series of columns containing as a column filling material a cation exchange resin. Preferably, a strongly acid cation exchange resin comprises the beds. The strongly acid cation exchange resin can be in monovalent or divalent form. The monovalent form can comprise e.g. sodium, potassium or mixtures thereof. The divalent form can comprise e.g. calcium and magnesium or mixtures thereof.

Processing can occur in at least one of the following phases: a feeding phase, an eluting phase, or a recycling or circulation phase, and a product recovery phase. Desirably, liquid present in each loop comprises one or more separate dry solids profiles (dry solids profiles) and the dry solids profiles is recycled in the recycling phase of the loop. The dry solids profile(s) is also advanced during other phases such as the feeding phase, the eluting phase, and the product recovery phase. In one of the methods, a recycled fraction is recovered from the second loop and recycled to the first loop. The feed solution can also be derived from or contain part or all of the recycle fraction. Each loop is preferably different than the other loop and the dry solids profile(s) (dry substance profiles) can be recycled in all phases. Columns in the loops can be in the same phase or a different phase with each other. Advantageously, at least some of the phases during the processing of the molasses occur sequentially, continuously, or simultaneously.

Each loop can comprise a series of columns containing a cation exchange resin. The simulated moving bed (SMB) process in the first loop can be a continuous simulated moving bed (SMB) process or a sequential moving bed (SMB) process. The chromatographic fractionation in the second loop can comprises a batch method. Preferably, the chromatographic fractionation in the second loop comprises a continuous simulated moving bed (SMB) process or a sequential simulated moving bed (SMB) process. In one preferred embodiment the first loop is a continuous SMB and the second loop is a sequential SMB.

As used in this application, the term "dry substance profile" or "dry solids profile" can be considered to be the dry substance concentration profile in the chromatographic separation resin beds, which is formed during the operation of a simulated moving bed (SMB) process by feeding the feed solution and eluent into one or more separation columns in the loops and collecting the product fractions from one or more loops. Fast moving components are concentrated in the front slope of the dry substance profile and slowing moving components are concentrated in the back slope of the dry substance profile.

By feeding eluant and feed solution containing constituents, by withdrawing product fractions, and by the flow through the chromatographic bed(s), a dry solids profile is formed in the chromatographic bed(s) constituents having a relatively low migration rate in the chromatographic bed are concentrated in the back slope of the dry solids profile, while constituents having a higher migration rate are concentrated in the front slope of the dry solids profile.

The liquid(s) present in the partial packing material beds with their dry solids profile(s) can be recycled in the recycling phase in a loop comprising one, two or several partial packing material beds. "Partial packing material bed" as used in this application can mean a section of a chromatographic separation resin bed, which is separated from the other sections of one or more resin beds, by some means, such as by intermediate bottoms, feeding and collection devices or partial packing material beds which are located in the separate columns.

In sequential or continuous simulated moving bed (SMB) systems, the chromatographic bed(s) is typically divided into sub-sections. A chromatographic beds is usually packed with some type of chromatographic adsorbent, packing material. "Partial packing material bed" can be any kind of sub-section of the chromatographic bed. The chromatographic bed(s) can be constructed of a single column or multiple columns, which are divided into section or compartments. The chromatographic bed can also be constructed of several discrete columns, tanks, or vessels, which are connected by pipelines.

Processing in the first loop can comprises one or more of the following phases: one or more molasses feeding phases, one or more feeding phases of an eluent liquid, one or more recycling phases, and/or one or more recovery phases of at least one product. Processing in the second loop can include one or more feeding phases, one or more recycling phases, one or more feed phase of eluent liquid and/or product recovery phase. The processing can comprise a plurality of recycling phases. The processing can also comprise five to ten steps or twenty steps, which form a sequence which is repeated. In one preferred method, the sequence is repeated five to seven times in order to reach an equilibrium in the system, and the method is continued essentially in the state of equilibrium. A sequence can comprise steps during which different beds are in the same or different phases simultaneously Processing of the molasses can further comprise feeding a feed solution derived from the molasses in the first loop and, subsequently, fractionating the feed solution in the first loop by a chromatographic simulated moving bed (SMB) process into at least two fractions, preferably at least one product fraction and at least one residual fraction. At least one of the fractions from the first loop, preferably a product fraction from the first loop, can be crystallized to form a crystallized fraction. A liquid, such as a solution or mother liquor, derived from the crystallization run-off of the crystallization of a fraction from the first loop, e.g. a product fraction from the first loop, can then be fed to the second loop where it is fractionated by chromatographic fractionation into at least two other fractions, preferably at least one other product fraction and at least one other residual fraction.

In the method, at least one of the fractions comprises a product fraction such that the product fraction comprises a greater percentage concentration by weight on a dry solids basis (dry substance basis) of the product than the feed solution comprising the molasses. Preferably, the product fraction also comprises a greater percentage concentration by weight on a dry solids basis of the product than the solution derived from the crystallization run-off. In the preferred method, (1) the product fraction from the first loop comprises a greater percentage concentration by weight on a dry solids basis of the product than the feed solution comprising the molasses and (2) the product fraction from the second loop comprises a greater percentage concentration by weight on a dry solids basis of the product than the feed solution comprising the molasses. In one preferred method, the product fraction from the second loop also comprises a greater concentration by weight on a dry solids basis of the product than the solution derived from the crystallization run-off from the crystallization after the first loop.

The fractions obtained from the fractionation in the first loop and/or the second loop can comprise one or more: sucrose fractions, betaine fractions, xylose fractions, residual fractions, or recycled fractions. Furthermore, the preceding fractions can comprise one or more compounds comprising: sucrose, betaine, xylose, glucose, galactose, rhamnose, mannose, and/or xylonic acid. The feed solution can comprises one or more compounds of: betaine, carbohydrates, sugars, sugar alcohols, ionic substances, divalent ions, monosaccharides, hexoses as glucose, galactose, mannose and rhamnose pentoses as xylose and arabinose, lignosulphonates, oligosacchadries and combinations of the preceding.

The product fraction(s) can be recovered from the first loop and/or the second loop. In one preferred method, the product fraction comprises a sucrose fraction. One of the fractions from the first loop and/or the second loop can comprise a betaine fraction. Preferably, the betaine fraction, comprises a greater percentage concentration of betaine by weight on a dry solids basis than at least one of the other fractions in the loops.

In another preferred method, the product fraction comprises a xylose fraction. The molasses can also comprise a xylose solution.

The feed solution can be pretreated before being fed to the first loop in at least one pretreatment process, such as: filtering, ultrafiltration, heating, chromatography, concentrating, evaporation, neutralization, pH adjustment, dilution, softening by carbonation, ion exchange or combinations of the preceding. Furthermore, the solution derived from the crystallization run-off, which is fed and fractionated in loop 2, can be treated before being feed and fractionated into loop 2, in at least one treatment process such as: filtering, ultrafiltration, heating, concentrating, evaporation, neutralization, pH adjustment, dilution, softening by carbonation, ion exchange or combinations of the preceding. Xylose can be converted into xylitol e.g. by hydrogenation before the loops between the loops or after the loops.

In the preferred method, the product fractions comprise sucrose fractions or xylose fractions. The product fraction(s) can be crystallized into a crystallized product, such as sugar, xylose or xylitol. Xylitol can be crystallized by e.g. cooling crystallization.

The invention offers an advantageous method particularly for the recovery of xylose from hardwood sulphite cooking liquor. The sulphite cooking liquor can be the liquor used in the cooking of sulphite cellulose, or the liquor ensuing from its cooking, or a part thereof. In one embodiment of the method, lignosulphonates can be recovered as the most rapidly eluted fraction and xylose which is the slowest to elute can be recovered as the product fraction.

The sulphite cooking liquor can comprise cooking chemicals, undissolved wood material, lignosulphonates, organic acids, hexose and pentose sugars derived as hydrolysis products of hemicellulose, as well as small amounts of oligosaccharides, if hydrolysis into monosaccharides has been incomplete. Normally a low pH in pulp cooking contributes to the hydrolysis of hemicellulose into monosaccharides. When the pulp is produced from hardwood, the major part of the monosaccharides contained in the cooking liquor can consist of xylose, which can be employed as a raw material in the production of crystalline xylose, xylitol and/or furfural. When pulp is produced from softwood, the prevalent monosaccharide in the cooking liquor is mannose.

A more detailed explanation of the invention is provided in the following description and appended claims taken in conjunction with the accompanying drawings.

DETAILED DESCRIPTION OF THE INVENTION

Figure 1A:
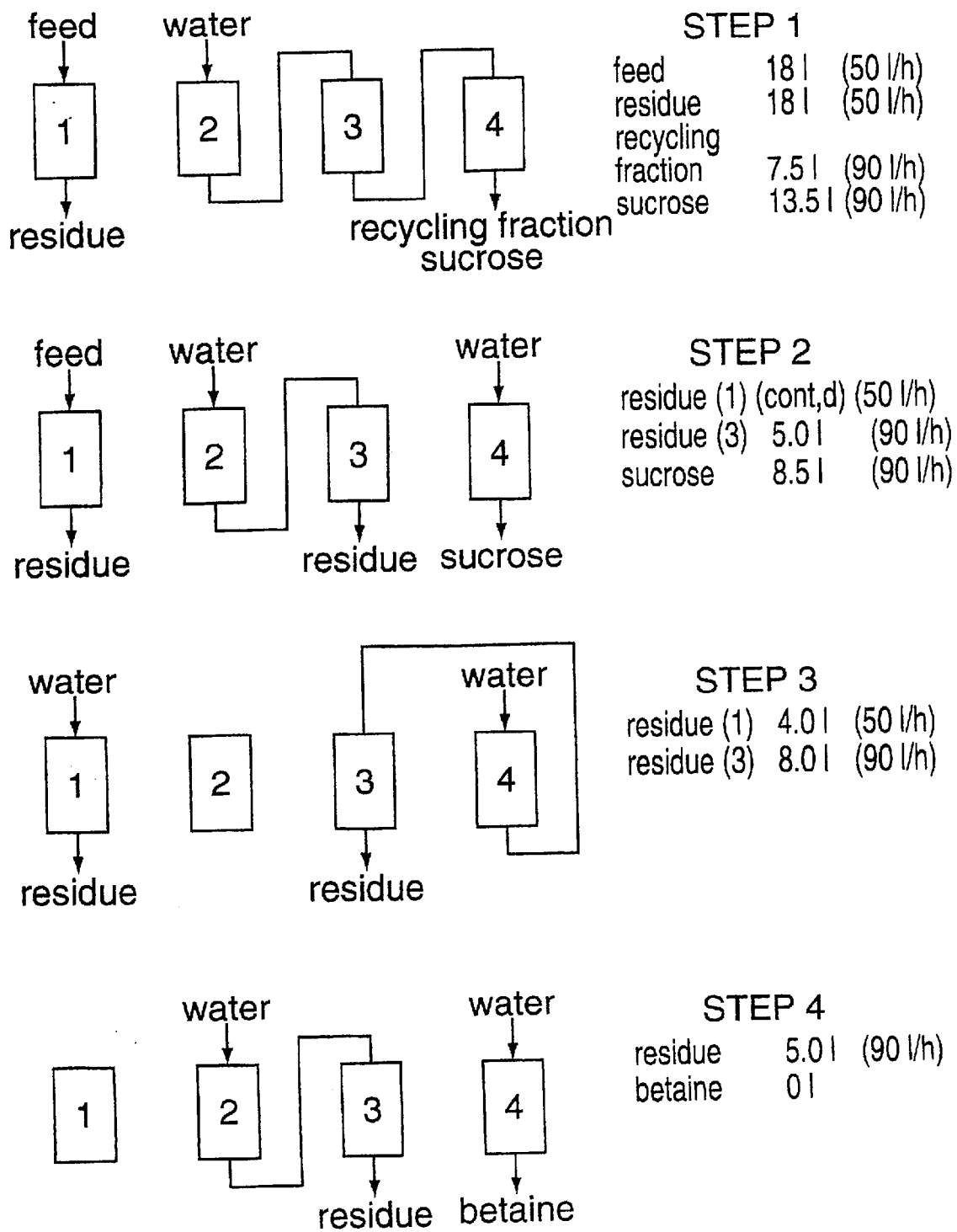
FIGS. 1A and 1B show a flow chart of the pilot plant of Example 1.

The following is a detailed description and explanation of the preferred embodiments of the methods of the invention along with some examples thereof.

In the novel method, the liquid flow can be arranged in a system comprising at least two partial packing material beds, and the product(s) can be recovered during a multi-step process and/or sequence. The partial packing material bed usually comprises one column. The process or sequence can comprise feeding, eluting, recycling, and product recovery phases. During the feeding phase, a feed or feed solution such as molasses or solution derived from molasses, with or without an eluent liquid such as water, is feed to one or more columns in one or more loops. During the eluent phase an eluent liquid such as water is fed to one or more columns in one or more loops. During the recycling phase, the liquid in the partial packing material beds with their dry solids profile(s) can be recycled in a loop comprising one, two or several partial packing material beds. The dry solids profile is also advanced in the feeding phase, eluent phase, and product recovery phase. Different phases can be used simultaneously in the same or different loops. In any one loop there may be present one or several dry substance profiles which advance in the loop prior to any product recovery.

By the new method, recovery of third component can be improved. The load of the second loop can be decreased by crystallization steps between the loops. This means that fewer separation columns may be required. Different products can effectively be recovered from different loops, e.g. because of enrichment of third component in the mother liquor in the crystallization step, the recovery of third component can be improved in the second loop leading to good yield and high purity in the product fraction. Different separation conditions can be used in loop 1 and loop 2. Separation in loops 1 and 2 can be different. Advantageously, different ion forms can be used in loop 1 and loop 2. Different crosslinking degree of the resin can be used in loops 1 and 2. Advantageously, a low crosslinking resin can be used in loop 2.

In the novel method, recycling can be employed by effective ways. In the recycling phase one, two or three or even more separate successive loops can be formed. For example, the number of columns being four, the loop preferably comprises two columns. The loop may be closed or "open", i.e., when liquid is recycled in the other loop, eluent liquid can be fed into the other loop and the product fraction can be recovered therefrom. During feed and elution, the flow through the packing material beds can be effected between successive loops, the flows conveying material from one loop to another. During the recycling phase, the loop is closed and separated from the other loops. One or more separate dry solids profiles can be recycled in each loop. One or several loops can be before the first loop. The second loop can be followed with one or several loop. In the first loop can be one or several dry solids profiles. Also the other loops can have one or several dry solids profiles.

In the method as discussed above, at least two separation profiles can be present in the same loop. A separation profile is formed by the feed solution and the dry substance recirculated. The separation profile is a complete or an essentially complete dry solids profile.

A separation profile can be formed by the feed solution fed to the loop under consideration and the dry substance is recirculated. The separation profile can comprise all constituents present in the feedstock, i.e. constituents having a low migration rate, constituents having an intermediate migration rate, and constituents having a high migration rate. Preferably, part of the constituent having the highest migration rate is withdrawn prior to the circulation phase.

In the method, two or more separation profiles (dry solids profiles) in the chromatography system can be created similarly to the one profile process, by a sequence or continuity of steps, where liquids are fed into, and taken out from predetermined points of the system, or circulated within it. In a multiple profile loop, two or more separation profiles (dry solids profiles) are moving and present in the loop. In a single profile loop, only one separation profile (dry solids profile) is moving and present in the loop.

There can be two or three parallel operations within one step. The flow rate of the operations can be controlled so that they end practically simultaneously. The flow in all columns can be continuous except for short pauses (brakes) during step shift. There are many possibilities to arrange the steps, according to process design and conditions.

Molasses is rich in various coloured components (colourants) which were difficult to remove completely enough by the earlier methods. Separate colour-removing phases were needed, or two-step crystallization had to be used to obtain a colourless product. The novel method according to the invention can provide greater colour removal in the molasses fractionating phase alone. The major part of the colour can be separated already in the column group of that loop to which the feed solution is supplied, and it will not essentially contaminate the column groups of the second (or third) loop. Continuous and stable colour removal can be achieved. When a batch method or conventional simulated moving bed methods (continuous or sequential), for instance, are employed, colour removal is normally only 75% to 80% in continuous long-term separation.

Also the separation of non-sugars, i.e. salts, is efficient when the method of the invention is used, and thus the sucrose content of the sugar fraction obtained from the separation can be very high, usually in advantageous cases in excess of 92% to 95% of the dry solids. The majority of the salts can be separated already in the column group of that loop to which the feed solution is supplied, and thus the ion exclusion can be more complete in the following loops. As the result, the peaks are more symmetrical, sharper and give higher purity sucrose fraction with improved yield. When the traditional batch method or conventional simulated moving bed methods (continuous or sequential), for instance, are employed, the sucrose content of the sugar fraction is in advantageous cases usually about or below 90% to 92% of the dry solids.

A strongly acid, gel-type cation exchange resin (e.g. "Zerolit 225", "Finex" or "Purolite") preferably in the sodium or potassium form can be used as a packing for the columns e.g. for the separation of cane molasses. Mg- and/or Ca-form can be used for separation of wood molasses derived e.g. by si-cooking from hardwoods.

Prior to the chromatographic fractionation, the feed solution (beet molasses) can be diluted with water to 20% to 65% by weight, softened with sodium carbonate and finally filtered using diatomaceous earth as a filtering aid. Prior to feed into separation columns, the molasses solution can be heated to 40 to 85 degrees C. and even to 95 degrees C.

Water preferably at 40 to 85 degree. C. can be used for the elution.

The flow rate of the liquid in the columns can be 0.5 to 10 $m^3/h/m^2$, even 20 $m^3/h/m^2$.

As indicated previously the molasses can comprise cane molasses, also referred to as sugar cane molasses, as well as solutions derived from cane molasses. Sugarcane processing can comprise extraction of sugar cane juice by milling or diffusion, clarification of the juice, concentration of the juice to syrup by evaporation, crystallization of sugar from the syrup, and separation and drying of the crystals.

Juice extraction from sugarcane: Sugarcane can be sliced, such as by revolving knives, into chips to expose the tissue and open the cell structure, to prepare the sugarcane for extraction of the juice. Sometimes, knives are followed by a shredder, which breaks the chips into shreds for finer sugarcane preparation. The chipped and shredded sugarcane can then be processed in a crusher, comprising a set of roller mills in which the sugarcane cells are crushed and juice extracted. As the crushed sugarcane proceeds through a series of roll mills, the sugarcane can be forced against a countercurrent flow of water, sometimes referred to as maceration or imbibition. Streams of juice can be extracted from the cane, mixed with maceration water from the mills, and combined into a mixed juice called dilute juice. Juice from the last mill in the series which may not receive maceration water is sometimes referred to as residual juice.

The alternative to extraction by milling of sugarcane is extraction by diffusion. In this process, sugarcane can be sliced by rotating knives and a shredder and moved through a multicell, countercurrent diffuser. Extraction of sugar is higher by diffusion. Occasionally a smaller bagasse diffuser is used to increase extraction from partially milled cane after two or three mills. Residual cane fiber, after juice is removed, is sometimes referred to as bagasse.

Clarification of sugarcane juice: Mixed sugarcane juice from the extraction mills or diffuser can be purified by addition of heat, lime, and flocculation aids. The lime can be a suspension of calcium hydroxide, that can be in a sucrose solution, which forms a calcium saccharate compound. The heat and lime kill enzymes in the juice and increase pH from a natural acid level of 5.0 to 6.5 to a neutral pH. Control of pH is important throughout sugar manufacture because sucrose inverts, or hydrolyzes, to its components glucose and fructose at acid pH (less than 7.0), and all three sugars can quickly decompose at high pH (greater than 11.5).

Heated to 99 to 104 degrees C. (210 to 220 degrees F.), the neutralized sugarcane juice can be inoculated, with flocculants, such as polyacrylamides, and pumped to a continuous clarification vessel, in which clear juice flows off the upper part while muds settle below. This settling and separation process is known as defecation. Muds can be pumped to rotary vacuum filters, where residual sucrose can be washed out with a water spray on a rotating filter. Clarified sugarcane juice, can be pumped to a series of evaporators, such as three to five multiple-effect evaporators.

Concentration of sugarcane juice: In a multiple-effect system, steam can be used to heat the first of a series of evaporators. The sugarcane juice can be boiled and drawn to the next evaporator, which is heated by vapor from the first evaporator. The process can continue through the series of evaporators until the clarified sugarcane juice, which can comprise 10 to 15% by weight sucrose, is concentrated to evaporator syrup. The evaporator syrup can comprise of 55% to 59% by weight sucrose and 60% to 65% by weight total solids.

Crystallization of concentrated sugarcane juice: Sugarcane syrup from the evaporators can be sent to vacuum pans, where it is further evaporated, under vacuum, to supersaturation. Fine seed crystals can be added, and the sugar ("mother liquor") can yields a solid precipitate of about 50% by weight crystalline sugar. Crystallization can be a serial process. The first crystallization, yielding A sugar or A strike, leaves a residual mother liquor sometimes referred to as A molasses. The A molasses can be concentrated to yield a B strike, and the low-grade B molasses can be concentrated to yield C sugar and final molasses, sometimes referred to as blackstrap. Blackstrap can comprise 25% by weight sucrose and 20% by weight invert sugar (glucose and fructose).

Centrifuging, crystal separation and drying: Sugarcane crystals and mother liquor can separated in basket-type centrifuges. Continuous centrifuges can be used for C sugar and B sugars, but batch centrifuges are often preferred for A sugars because of the crystal breakage that can take place in continuous centrifuges. Mother liquor can be spun off the crystals, and a fine jet of water can be sprayed on the sugar pressed against the wall of the centrifugal basket, reducing the syrup coating on each crystal.

The washed raw sugar, can be discharged from the baskets onto moving belts, and dried and cooled on the belts as it moves to bulk storage. Raw sugar can be pale brown to golden yellow, with a sucrose content of above 97% to 99% by weight and a moisture content of about 0.5% by weight.

Sugarcane refining: Sugarcane refining is the production of high-quality sugars from remelted raw cane sugars. More than on-third of cane sugar is refined. The remainder is consumed as plantation white or as raw sugar. Sugarcane refining can be conducted by large refineries, which produce a range of products such as soft brown sugars, sugar cubes, and granulated sugar. At these refineries, the raw sugar can be affined (washed), melted (dissolved), sent through processes of clarification and decolorization, and crystallized. Sugar products are then dried, packaged, and stored.

Affination and melting of sugarcane: Affination is the mingling of raw sugarcane with a warm, heavy syrup, which removes the molasses coating from the sugar crystal. The syrup and crystals can be separated in a spinning centrifugal basket, and the crystals are further washed by a water spray. Washed raw sugar can be fed by screw conveyor to a melter, where it is dissolved, such as at 65 degrees C., in hot sweet water with some fresh hot water added to obtain a raw liquor, such as containing about 65% dissolved solids.

Clarification and decolorization: Melt syrup from sugarcane can be clarified by phosphatation in which phosphoric acid and lime are added to form calcium phosphates, which are removed by surface scraping in a flotation clarifier. Melt syrup from sugarcane can also be clarified by carbonatation, in which carbon dioxide gas and lime form calcium carbonate, which can be filtered off. Color precipitants can be added to each process. The carbonatated liquors derived from sugarcane can be filtered, such as in pressure leaf filters and/or with filters, such as diatomaceous earth. The resultant yellow to light brown liquor can be further decolorized by carbon adsorbents, such as granular activated carbon or bone charcoal, or by ion-exchange resins of acrylic or styrenic materials. Decolorization can be conducted in columns in various serial or parallel conformations.

Crystallization of clarified liquor derived from sugarcane: Fine clarified liquor derived from sugarcane can be boiled to white sugar in a series of vacuum pans similar to those used in sugarcane processing. The boiling system can comprise at least six or seven stages of boiling. The first three or four strikes can be blended to make commercial white sugar. Special large-grain sugar for bakery and confectionery can be boiled separately. Fine grains or fruit sugars can be produced by sieving products of mixed grain size. Powdered icing sugar, or confectioners' sugar, results when white granulated sugar is finely ground, sieved, and mixed with small quantities of starch or calcium phosphate to keep it dry. Brown sugars (light to dark) can be either crystallized from a mixture of brown and yellow syrups with caramel added for darkest color or made by coating white crystals with a brown-sugar syrup.

Sugar from both cane and beets can be produced with the assistance of vacuum boiling pans, centrifuges, and multi-effect evaporators.

Sugar beets are typically planted in Spring and harvested in the Autumn. After growers harvest the crop, sugar beet processors recover products from the sugar beet root: sucrose or sugar, molasses, and beet pulp. The sugar beet factories can extract sugar from the beets, purify the juice using lime and carbon dioxide, then crystallize the sugar.

Sugar beet harvest: Sugar beets can be harvested by multirow harvester machines. The harvesting machines can remove dirt, leaves, and sometimes the crown. Because sugar does not deteriorate as severely in beets as it does in sugarcane shortly after harvest, a full crop of beets can be harvested and stored for several weeks at ambient temperature or even for several months at freezing temperatures.

Washing, slicing and extraction of sugar beets: When the harvested sugar beets are delivered to the factory, they are washed, such as in a flume, to remove rocks and dirt and then fed by gravity through a hopper to the slicing machine which can comprise a rotating beet slicer. The beet slicer slices and cuts the sugar beets into pieces or cossettes, in order to offer maximum surface area for extraction. The objective is to maximize the surface area of the beet so as to facilitate the diffusion of the sucrose. The cossettes then enter a counter-current diffuser through which they move against the flow of a hot water extractant. This operation can transform about 98% of the sugar from the beet into a raw juice. The juice, in turn, is purified, reduced by evaporation, and crystallized, and the crystals are separated in centrifuges from the mother liquor.

The cossettes (sliced beet pieces) can be transferred to the diffuser by conveyer belts. Diffusion can be a thermo-mechanical process where the cossettes are washed with warm water and lightly squeezed to release raw juice. The diffuser can be a multi-cell counter-current diffuser, a diffusion tower, or a continuous beet diffuser. Cossettes can enter the diffuser from below and can be carried upward where they can be released as wet pulp to the pulp presses. Fresh hot water and recycled can be fed into the diffuser and flow countercurrent to the cossettes. This mixture can exit the diffuser, such as at the bottom of the diffuser, as a sucrose-rich diffusion juice, usually referred to as raw juice. This extraction can be processed at 71 to 77 degrees C. Formalin can be added to the recycled water to inhibits bacterial growth. The pH at this point can be about 5.5 to 5.6 and can be controlled by sulfur dioxide addition.

Purification of raw beet juice: Raw beet juice typically containing 10% to 14% sucrose by weight, can be purified by a series of liming and carbonatation steps, often with filtration or thickening being conducted between the first and second carbonatation. A multistage system can comprise cold pre-liming followed by cold main liming, hot main liming, first carbonatation, first filtration, mud recirculating, addition of heat and soda, second carbonatation, and second filtration.

After carbonatation, sulfur dioxide can be pumped through the juice in order to lower the pH level and reduce the colour. Beet processing is generally at pH levels slightly above 7. At a low pH, invert sugar can form and react with nitrogen compounds to form colour. At a high pH, alkaline destruction of sucrose and monosaccharides can occur.

First carbonation of raw beet juice: In the purification and filtration portion of the process, raw beet juice from the extraction stage can be mixed with milk of lime, $Ca(OH)_2$ to coagulate the impurities. The mixture can be heated, such as to 76 to 82 degrees C., and carbonated by carbon dioxide $CO_2$ gas injection in the precarbonation tank. The pH can be adjusted, such as between 8.8 to 9.0 with calcium hydroxide, $Ca(OH)_2$. The beet juice can then be pumped to another lime tank. Carbonation can be performed by injecting carbon dioxide gas into the bottom of each tank. Carbonated juice can overflow at the top of the tank. The beet juice can be conveyed from the precarbonation and liming stage to the first carbonation step. Juice exiting the first carbonation can be about 11.2 pH at about 88 degrees C.

Second carbonation of raw beet juice: The carbonated juice and calcium carbonate precipitate can be sent to the thickener or mud-settling tank where the two juices (clarified and muddy) can be separated. The muddy juice can be filtered and this filtrate and the clarified juice can be blended and filtered, such as with ceramic filters. The filtrate can be heated, such as to 97 to 99 degrees C., and then fed into the second carbonation tank where the filtered juice can be carbonated with carbon dioxide. Once the second carbonation is completed such as at a pH of 8.7 to 8.8 at about 98 degrees C., the juice can be conveyed to a collection tank where it is again filtered. The juice can then be injected with sulfur dioxide (sulfitation), which serves as a bleaching agent to lower the pH to about 8.0, and can then be sent to the evaporators.

Concentration of thin beet juice and crystallization of thick beet juice: After purification, the clear or thin beet juice, can be pumped to multiple-effect evaporators similar to those used in raw cane sugar manufacture. In the evaporators the thin beet juice can be concentrated to thick beet juice, such as comprising 60% to 65% by weight dissolved solids. The thick beet juice can be mixed with remelted lower grades of sugar to form standard liquor. From this standard liquor, the sugar can be crystallized, usually in three stages. In boiling systems, sugar obtained from the first stage can be processed as a final product, while sugar from the second and third stages can be remelted and recycled into another batch of thick juice. Sugar can be separated from mother liquor in basket centrifuges, and can be dried in either rotary louverd driers or fluidized-bed dryer-coolers.

Crystallization of beet sugar: In order to produce white sugar products, standard beet juice liquor can be fed into vacuum pans which have been previously seeded to promote crystal growth. The pH can be controlled at 8 to 9 pH, such as with sodium hydroxide, NaOH. Sugar crystals can be grown in a mixture of standard liquor and first molasses. This massecuite (standard liquor, first molasses and suspended sugar crystals) can be centrifigally separated into raw sugar and molasses. The molasses can be reboiled to obtain the second massecuite and again separated into the second raw sugar and second molasses. This process can be repeated a third time to obtain the third sugar and third molasses. Exhausted (third) molasses can be removed from the process via the exhausted molasses tank.

Molasses can comprise one or more solutions derived from molasses, including: raw juice, diffusion juice, thin juice, thick juice, dilute juice, residual juice, as well as other juices, and liquids.

Crystallization run-off can comprise mother liquor from the crystallization of a product fraction from the first loop (Loop 1). Preferably, crystallization run-off comprises mother liquor from the crystallization of the: sugar beet sucrose (beet sugar) fraction from Loop 1, sugar cane sucrose (cane sugar) fraction from Loop 1, or the xylose fraction from Loop 1.

As indicated previously, the method of this invention can be used to process molasses, such as: beet molasses, cane molasses, stillage, vinasse, wood molasses, biomass molasses, wheat molasses, barley molasses, corn molasses, and solutions derived from any of the preceding. The wood molasses and the biomass molasses can comprise a xylan-containing vegetable material, such as one or more of the following: wood, hardwood, birch, aspen, beech, eucalyptus, poplar, alder, particulates of grain straw, stems, hulls, husks, fiber, grains as wheat, corn, barley, rice and oat corn cobs, bagasse, almond shells, coconut shells, cotton seed bran, cotton seed skins, rice hulls, wood chips, and saw dust. The biomass molasses can also comprise biomass hydrolysates. The biomass hydrolysates can be obtained by a process, such as by: direct acid hydrolysis of biomass, prehydrolysate obtained by prehydrolysis of biomass with steam or by enzymes, acid hydrolysis of prehydrolysate obtained by prehydrolysis of biomass with acetic acid or steam or enzymes, steam explosion of biomass, spent liquor from pulping processes or a sulphite pulping process.

The wood molasses and the biomass hydrolysates can comprise one or more of the following: sulphite cooking liquor, spent sulphite pulping liquor, acid spent sulphite liquor, spent liquor from hardwood, spent liquor from softwood pulping before hexoses are removed, spent liquor from softwood pulping after hexoses are removed, spent liquor from digestion of said biomass, spent liquor from hydrolysis of the biomass, spent liquor from solvent-based pulping, spent liquor from ethanol-based pulping, mother liquor from crystallization of xylose, diluted runoff of crystallization of sulphite spent pulping liquor, waste solution(s) from the paper industry, and/or waste solution(s) from the pulping industry.

In a preferred methods, at least one product is recovered during processing of molasses in two or more loops. Each loop can comprise one or more chromatographic beds, columns, or parts thereof which are separate and distinct from the chromatographic beds, columns, and parts thereof in the other loop(s). The loops can comprise at least a first loop and a second loop. Desirably, at least some of the phases occur sequentially, continuously, or simultaneously.

Processing can occur in at least one of the following phases: a feeding phase, an eluting phase, and/or a recycling or circulation phase. Desirably, liquid present in each loop comprises one or more separate dry solids profiles (dry solids profiles) and the dry solids profiles can be recycled in the recycling phase of the loop. In one method, a recycled fraction is recovered from the second loop and recycled to the first loop. The feed solution can also be derived from or include part or all of the recycle fraction.

Processing of the molasses can further comprise feeding a feed solution derived from the molasses in the first loop and, subsequently, fractionating the feed solution by a chromatographic simulated moving bed (SMB) process in the first loop into at least two fractions, preferably at least one product fraction and at least one residual fraction. At least one of the fractions from the first loop, preferably a product fraction from the first loop, can be crystallized to form a crystallized fraction. A liquid derived from the xylose crystallization run-off, e.g. mother liquor, of the crystallization of the fraction, e.g. product fraction of first loop, can then be fed to the second loop where it is fractionated by chromatographic fractionation into at least two other fractions, preferably at least one other product fraction and at least one other residual fraction. In the preferred method, at least one of the fractions comprises a product fraction such that the product fraction comprises a greater percentage concentration by weight on a dry solids (dry substance) (ds) basis of the product than the feed solution comprising the molasses. Preferably, the product fraction from the first loop comprises a greater percentage concentration by weight on a dry solids (dry substance) (ds) basis of the product than the feed solution comprising the molasses. Desirably, the product fraction from the second loop further comprises a greater percentage concentration by weight on a dry solids (dry substance) (ds) basis of the product than the feed solution comprising the molasses. In one preferred method, the product fraction comprises a greater percentage concentration by weight on a dry solids (dry substance) (ds) basis of the product than the solution derived from the crystallization run-off. Advantageously, the product fraction from the second loop also comprises a greater concentration by weight on a dry solids (dry substance) (ds) basis of the product than the solution (liquid) derived from the crystallization run-off.

As indicated previously, each loop can comprises a series of columns containing a cation exchange resin as a column filling material. The simulated moving bed (SMB) process in the first loop can be a continuous simulated moving bed (SMB) process or a sequential moving bed (SMB) process. The chromatographic fractionation in the second loop can comprises a batch method. Preferably, the chromatographic fractionation in the second loop comprises a continuous simulated moving bed process or a sequential simulated moving bed (SMB) process. Most preferable a continuous simulated moving bed process in the first loop and a sequential in the second loop. Second loop can be after the first loop without the crystallization between. The continuous simulate moving bed process in the first loop can be operated at high capacity and low dilution to recover products with high yield and purity in the second loop using a simulated moving bed process.

The fractions obtained from fractionation in the first loop and/or second loop can comprise one or more: sucrose fractions, betaine fractions, xylose fractions, residual fractions, or recycled fractions. Furthermore, the preceding fractions can comprise one or more compounds comprising: carbohydrates, betaine, sugars, hexoses as, glucose, galactose, rhamnose and mannose, pentoses as xylose and arabinose, sugar alcohols, and/or xylonic acid. The feed solution can comprises one or more compounds of: betaine, carbohydrates, monosaccharides, sugar alcohols, ionic substances, pentoses, as xylose, arabinose, hexoses as glucose, galactose, mannose and rhanmose, xylonic acid, lignosulphonates, or oligosacchadries, and combinations of the preceding.

The product fraction(s) can be recovered from the first loop and/or said second loop. In one preferred method, the product fraction comprises a sucrose fraction. One of the fractions from the first loop and/or the second loop can comprise a betaine fraction. Preferably, the betaine fraction, comprises a greater percentage concentration of betaine by weight on a dry solids (dry substance) (ds) basis than at least one of the other fractions in the loops.

Each loop is preferably different than the other loop and the dry solids profiles (dry substance profiles) can be recycled in all phases. Phases in the loops can be in the same phase or a different phase with each other. The loops can be open or closed. A solution, liquid, or fraction from one loop can be transferred or passed to another loop when the loops are open.

The feed solution can be pretreated before being fed to the first loop in at least one pretreatment process, such as: filtering, ultrafiltration, heating, chromatography, concentrating, evaporation, neutralization, pH adjustment, dilution, softening by carbonation, ion exchange or combinations of the preceding. Furthermore, the solution derived from the crystallization run-off, which is fed and fractionated in Loop 2, can be treated before being feed and fractionated into Loop 2, in at least one treatment process such as: filtering, ultrafiltration, heating, concentrating, evaporation, neutralization, pH adjustment, dilution, softening by carbonation, ion exchange or combinations of the preceding. Between the loops xylose can be converted into xylitol e.g. by hydrogenation.

Processing in the first loop can comprises one or more of the following phases: one or more molasses feeding phase, one or more feeding phases of an eluent liquid, one or more recycling phase, and/or one or more recovery phase of at least one product. Processing in the second loop can include one or more recycling phases, a feed phase of feed solution and eluent liquid and/or product recovery phase. The processing can comprises a plurality of recycling phases. The processing can also comprises five to ten steps or phases. In one preferred method, the steps are repeated five to seven times in order to reach an equilibrium in the system, and the method is continued in the state of equilibrium reached.

The system of the method can comprises 3 to 12 or even 20 chromatographic beds. Each loop can comprises a series of columns containing a cation exchange resin as a column filling material. Preferably, a strongly acid cation exchange resin comprises the beds. The strongly acid cation exchange resin can be in monovalent or divalent form. The monovalent form can comprise sodium, potassium or mixtures thereof. Divalents can comprise calcium and magnesium or mixtures thereof.

The flow rate of the liquid in the beds can range from 0.5 to 20 $m^3/h/m^2$, preferably 0.5 to 10 $m^3/h/m^2$. The eluent preferably comprises water. The temperature of the feed solution and the water can range from about 40 degrees C. to 95 degrees C., preferably from about 40 to about 85 degrees C. The feed solution can have a dry solids (dry substance) (ds) content ranging from 20% to 80%, preferably 20% to 65% by weight dry solids.

In other preferred methods, the product fractions comprise sucrose fractions or xylose or xylitol fractions. The product fraction(s) can be crystallized into a crystallized product, such as crystallized sucrose, xylose or xylitol.

Xylitol can be crystallized e.g. by cooling crystallization. When cooling crystallization is used, xylitol crystals, such as having an average diameter of about 30 microns, can be added as seed crystals to the xylitol solutions and preferably to a concentrated xylitol solution obtained from the xylose fraction. The temperature of the xylitol solution can be slowly decreased. The xylitol crystals which are obtained in the preceding manner can have an average diameter from about 250 to 600 micrometers ($\mu$). The xylitol or xylose crystals can be separated by centrifugation and washed with an eluent, such as water, to obtain substantially pure crystalline xylitol. The liquor remaining from the centrifugation and/or crystal washing can comprise crystallization run-off for use as a feed to Loop 2. Prior to crystallization, the xylitol solution can be concentrated by heating, evaporation, etc.

A method of crystallization of xylose, such as from xylose-containing aqueous solution that contains over 30% by weight xylose on a dry solids basis, can be accomplished by evaporating the xylose-containing aqueous solution at low pressures to obtain a solution supersaturated with xylose. The supersaturated solution of xylose can then be seeded. Evaporation (preferably in vacuum) of the seeded supersaturated solution can continue at the boiling point of the solution until a crystal mass is obtained and xylose crystals are recovered. Byproducts comprising liquid solutions obtained during the crystallization of xylose can comprise crystallization run-off for use as a feed to Loop 2 in the method of the present invention.

More specifically, a xylose-containing solution, such as containing 30% to 60% by weight of xylose on a dry solids basis, can be supersaturated and subsequently crystallized by lowering the temperature of the solution. The solution to be treated can be supersaturated by subjecting the solution to evaporation at low pressure. The desired supersaturation can also be achieved by cooling. Desirably, the solution is evaporated to a dry solids (dry substance) (ds) content of 75% to 90% by weight. If the xylose purity of the solution to be treated is within the range of 30% to 50% by weight, then the dry solids (dry substance) (ds) content of supersaturated solution can be 82% to 95% and preferably 83% to 92% by weight. If the xylose purity of the solution can be treated is within the range of 40% to 60% by weight, then the dry solids (dry substance) (ds) content of the supersaturated solution can be 75% to 89% and preferably 78% to 86% by weight. Seeding may be performed during evaporation.

When the xylose-containing solution at least 50% by weight of xylose on a dry solids (dry substance) (ds) basis, the xylose-containing solution can be evaporated to supersaturation at boiling point of the solution, i.e. at 40° to 80° C. Thereafter the solution can be seeded and the evaporation in vacuum can be continued at the boiling point of the crystallization mass, i.e. the mixture of the supersaturated solution and the crystals. Preferably the crystallization mass is obtained in which is the crystal yield is at least 1% to 60% by weight of xylose on a dry solids (dry substance) (ds) basis with the content of the mass being over 70% by weight on a dry solids basis. In this manner, the rate of crystallization can be high since the temperature is suitable and the viscosity of the mother liquor is low, i.e. the mass and heat transport are efficient because of boiling. The pH of xylose-containing solution for the preceding crystallization method can be 2 to 7 with the disaccharide content below 4% on a dry solids basis. The evaporation can occur from 50 to 70 degrees C. Preferably, the temperature of the crystallization mass can be lowered by at least 10 degrees C. when the evaporation has been terminated. The crystallization mass can be cooled for 10 to 50 hours. In order to facilitate recovery of xylose crystals, the crystallized mass can be heated and/or diluted with an eluent, such as water. Centrifugation of crystallized mass can occur in a batch centrifuge or in continuous centrifuge and/or with water washing. The liquid solution obtained during centrifugation and/or water washing can comprise crystallization run-off for use as a feed to Loop 2 in the method of the present invention.

In the preceding crystallization method, a suitable seeding supersaturation can be 1.05 to 1.7. A suitable amount of seed crystals can be 0.001% to 1% by weight xylose of the crystallization mass depending on the seed quality and size of the seed crystals. The supersaturation of xylose-containing solution during crystallization can be 1.1 to 1.4 with a viscosity of 1 to 50 Pa s. Cooling can be accomplished in 20 to 50 hours or less to a temperature of 50 to 30 degrees C., preferably 45 to 40 degrees C., at a rate of 0.3 to 5.0 degrees C. per hour.

In the preceding crystallization method a centrifuging time can be 1–5 minutes with 2–7% washing water by weight of the crystallization mass in order to obtain a xylose purity of the crystal, such as 98–99%, and a desired xylose yield, such as 40–65%. The crystallization mass can be transferred to a cooling crystallizer where it is cooled such as to about 30 degrees C. in about 30–60 hours. Thereafter, the crystallization mass can be somewhat heated, before centrifugation, such as in a continuous centrifuge to produce a desired xylose purity of the crystal, such as 92–98%, with a crystallization run-off yield of about 40–65%. When the crystallization mass is cooled, such as in a cooling crystallizer, e.g. to about 40 degrees C. in about 40 hours, the xylose crystals can be separated from the mother liquor in a batch centrifuge in a desired centrifugation time, such as 1–6 minutes. With 4–8% by weight washing water based on the weight of the crystallization mass, a desired xylose purity of the crystal, such as 93–98.5%, and a desired xylose yield, such as 45–65%, can be obtained. The spent washing water resulting from centrifuging the crystallized mass can comprise crystallization run-off for use as a feed to Loop 2 in the method of the present invention. A more detailed explanation of a crystallization method can be found in U.S. Pat. No. 5,951,777.

The following examples illustrate the novel simulated moving bed (SMB) method for the fractionation of molasses. These examples shall not be regarded as restricting the scope of the invention, as they are only examples of employing the method according to the invention.

Among the many advantages of the methods of the invention are:

1. Improved molasses processing.
2. Superb recovery and purity of sucrose.
3. Excellent recovery and purity of betaine.
4. Enhanced recovery and purity of xylose and/or xylitol
5. Efficient.
6. Effective.

Although embodiments of this invention have been shown and described, it is to be understood that various modifications, substitutions, and rearrangements of columns, beds, loops, equipment, and method (process) steps, as well as the use of various feed solutions, different compositions of crystallization run-off, and recovery of various fractions, can be made by those skilled in the art without departing from the novel spirit and scope of this invention.

EXAMPLE 1

Separation of Sucrose and Betaine with 2 Loops

Figure 1B:
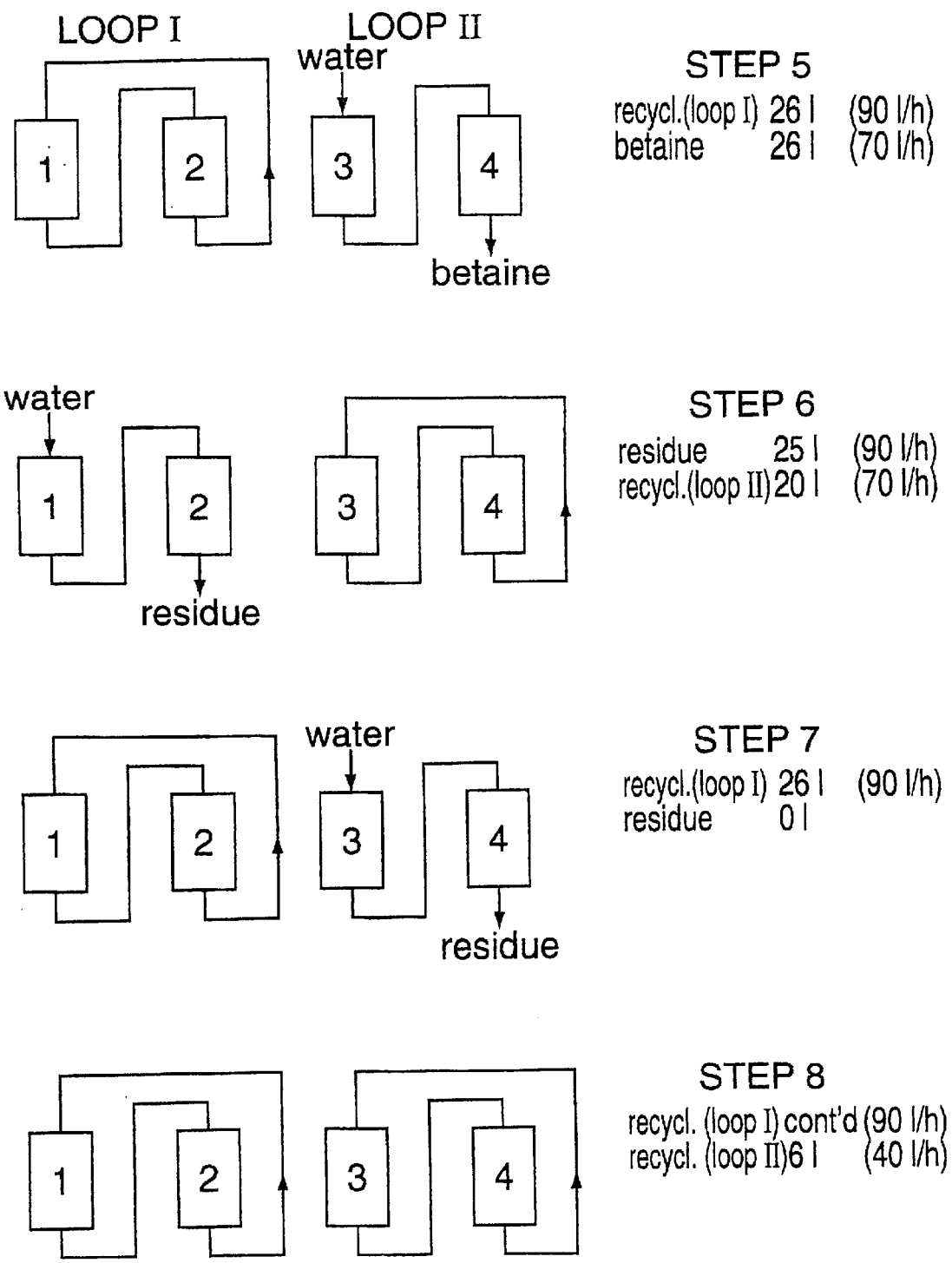

A pilot plant scale chromatographic test apparatus was employed. The apparatus included four columns, feed pumps, recycling pumps, eluent water pumps, flow and pressure regulators, and inlet and outlet valves for the different process streams. The flowchart of the method of Example 1 is shown in FIG. 1.

The columns were packed with a strongly acid cation exchange resin (such as sold under the brand name of "Purolite"). The resin had a polystyrene/divinylbenzene backbone and was activated with sulphonic acid groups; the mean spherule size was about 0.36 mm. The resin had a DVB content of 5.5%. Initially the resin had been regenerated to sodium form, and during the run it was balanced with cations from the feed molasses.

| Test Conditions | |
|---|---|
| Test Conditions: | |
| Diameter of columns | 200 mm |
| Height of resin bed/column | 2800 mm |
| Temperature | 75 degrees C. |
| Flow rate | 40, 50, 70 and 90 l/h |

The feed solution consisted of beet molasses wherefrom calcium had been removed by adding sodium carbonate (pH 9) and filtering the precipitate off using diatomaceous earth as an aid.

The separation of sucrose and betaine was performed by an eight-step sequence in which each column had its specific function. As shown in FIG. 1, steps 5, 6 and 7 each comprise one recycling phase and one feeding phase for eluent water, and step 8 two recycling phases. The duration of the sequence was 79 minutes and the sucrose yield 84.0% (on the amount of sucrose fed).

Step 1: Molasses was fed (feeding phase) into column 1 at flow rate 50 l/h, and the residue fraction was eluted from the downstream end of the column. Simultaneously water was supplied (eluting phase) to column 2 at a flow rate 90 l/h, and a recycling fraction and sucrose were eluted from column 4. The recycling fraction was used to dilute the raw material (molasses).

Step 2: Feeding of molasses into column 1 and elution of residue from the downstream end of column 1 were continued. Simultaneously water was supplied to columns 2 and 4 at a flow rate 90 l/h, the residue fraction was eluted from column 3, and the elution of sucrose was continued from column 4.

Step 3: Water was fed into columns 1 (50 l/h) and 4 (90 l/h), and the residue fraction was eluted from columns 1 and 3.

Step 4: Water was fed into column 2 at a rate 90 l/h, and the residue fraction was eluted from column 3.

Step 5: Recycling (recycling phase) in columns 1 and 2 at a rate 90 l/h; simultaneously water was supplied to column 3 at a rate 70 l/h and the betaine fraction was eluted from column 4.

Step 6: Water was fed into column 1 at a rate 90 l/h and the residue fraction was eluted from column 2; simultaneous recycling in columns 3 and 4 at a rate 70 l/h.

Step 7: Recycling in columns 1 and 2 at a rate 90 l/h.

Step 8: Recycling in columns 1 and 2 at a rate 90 l/h and in columns 3 and 4 at a rate 40 l/h.

After the sequence was completed, the process control program was continued and it returned to step 1. By repeating this sequence five to seven times, an equilibrium was reached in the system. The run was continued in a state of equilibrium, and product fractions with a constant composition were recovered and analyzed (cf. Tables 1 and 2).

The progress of the separation process was monitored with a density meter, a meter for optical activity, and a conductivity meter, and the separation was controlled by a microprocessor whereby precisely defined volumes and flow rates of feeds, recycled liquid and product fractions were controlled employing quantity/volume measuring, valves and pumps.

Table 1 shows the volumes of the feeds, recycled liquid and product fractions, and Table 2 shows the compositions of molasses and the product fractions. The sucrose and betaine fractions were recovered from column 4. Table 5 shows the colours of the molasses, residues and product fractions.

TABLE 1

Volumes of feeds, recycled liquid and product fractions (1) Step No.

| | 1 | 2 | 3 | 4 | 5 | 6 | 7 | 8 |
|---|---|---|---|---|---|---|---|---|
| Molasses feed | 18[x] | — | — | — | — | — | — | — |
| Water feed | 21 | 5.0 + 8.5 | 4.0 + 8.0 | 5.0 | 26.0 | 25.0 | 25.0 | — |
| Raffinate fraction From column 1 | 18[x] | | 4.0 | — | — | — | — | — |
| Raffinate fraction from column 2, 3 or 4 | — | 5.0 | 8.0 | 5.0 | — | 25.0 | 0 | — |
| Betaine fraction | — | — | — | — | 26.0[xx] | — | — | |
| Recycle fraction | 7.5 | — | — | — | — | — | — | — |
| Sucrose fraction | 13.5 | 8.5 | — | — | — | — | — | — |
| Recycled solution | — | — | — | — | 26.0 | 20.0 | 26.0[xxx] | |

[x] Total from steps 1 and 2
[xx] Total from steps 4 and 5
[xxx] Total from steps 7 and 8

TABLE 2

Compositions of feed and product fractions

| | Dry solids (kg/l) | Sucrose (% by weight ds) | Betaine (% by weight ds) | Other substances (% by weight ds) |
|---|---|---|---|---|
| Molasses feed | 0.76 | 58.2 | 5.6 | 36.2 |
| Residue fraction | 0.075 | 21.2 | 7.5 | 71.3 |
| Betaine fraction | 0.028 | 10.1 | 41.4 | 48.5 |
| Sucrose fraction | 0.279 | 94.8 | 0.7 | 4.5 |

EXAMPLE 2

Separation of Sucrose and Betaine with 2 Loops

Figure 2:
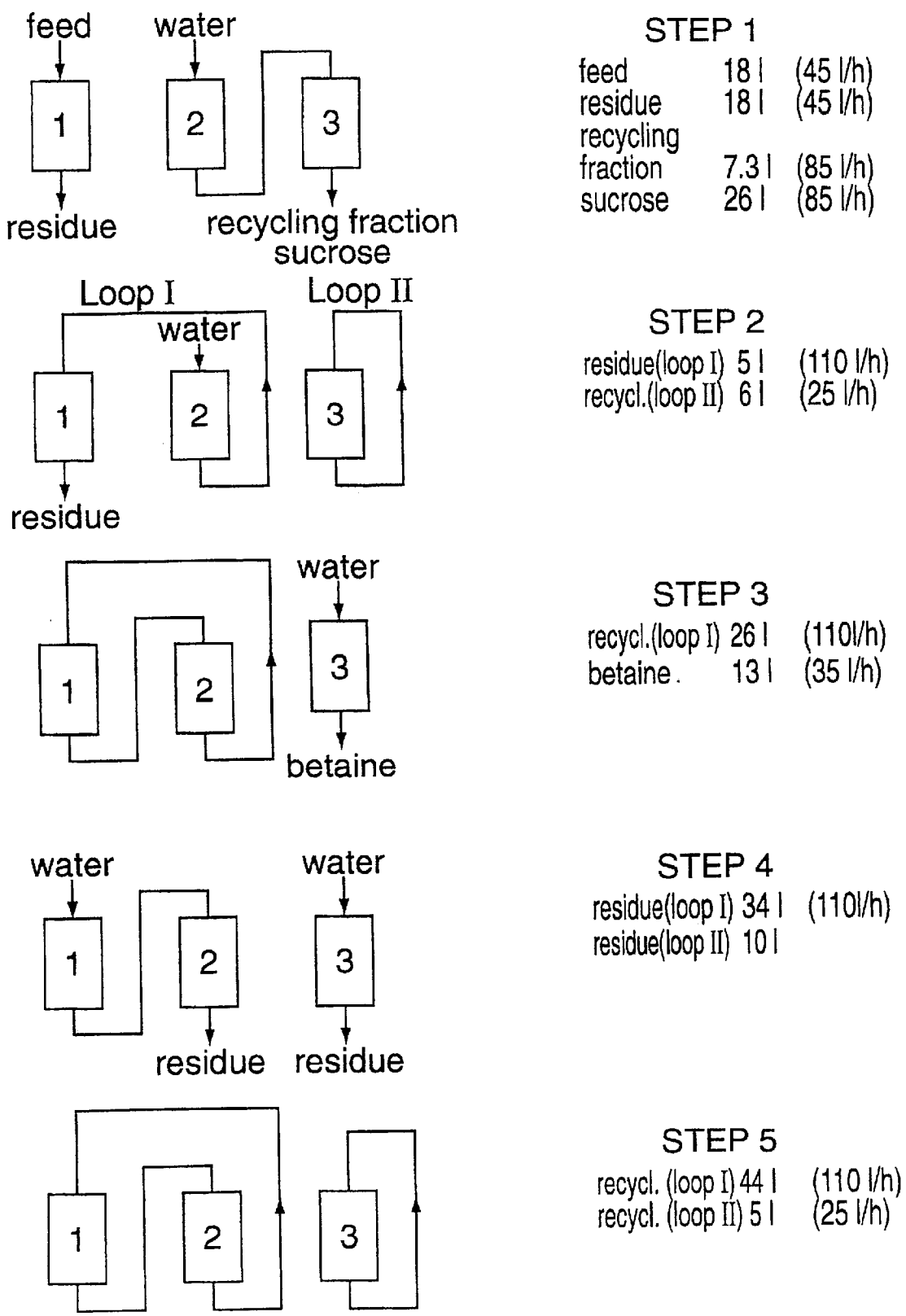
FIG. 2 shows a flow chart of the pilot plant of Example 2.

A pilot plant scale chromatographic test apparatus was employed. The apparatus included three columns, feed pumps, recycling pumps, eluent water pumps, flow and pressure regulators, and inlet and outlet valves for the different process streams. The flowchart of the method of Example 2 is shown in FIG. 2.

The columns had been packed with a strongly acid cation exchange resin (such as sold under the brand name of "Purolite"). The resin had a polystyrene/divinylbenzene backbone and was activated with sulphonic acid groups; the mean spherule size was about 0.36 mm. The resin had a DVB content of 5.5%. Initially the resin had been regenerated to sodium form, and during the run it was balanced with cations from the feed molasses.

Test Conditions

Test conditions:

| | |
|---|---|
| Diameter of columns | 200 mm |
| Height of resin bed: | |
| columns 1 and 3 | 4100 mm |
| column 2 | 2800 mm |
| Temperature | 75 degrees C. |
| Flow rates | 25, 35, 45, 85 and 110 l/h |

The feed solution consisted of beet molasses wherefrom calcium had been removed by adding sodium carbonate (pH 9) and filtering the precipitate off using diatomaceous earth as an aid.

The separation of sucrose and betaine was performed by a five-step sequence in which each column had its specific function. As shown in FIG. 2, steps 2 and 3 each comprised one recycling phase and one feeding phase for eluent water, and step 5 two recycling phases. The duration of the sequence was 100 minutes and the sucrose yield 87.3% (on the amount of sucrose fed).

Step 1: Molasses was fed into column 1 at flow rate 45 l/h, and residue was eluted from the same column (downstream end of the column); simultaneously water was supplied to column 2, and a recycling fraction and sucrose fraction were eluted from column 3 at a flow rate 85 l/h.

Step 2: Water was fed into column 2 at a rate 110 l/h, and the residue fraction was eluted from column 1; simultaneous recycling in column 3 at a rate 25 l/h.

Step 3: Recycling in columns 1 and 2 at a rate 110 l/h; simultaneously water was supplied to column 3 at a rate 35 l/h and the betaine fraction was eluted from the same column.

Step 4: Water was fed into column 1 at a rate 110 l/h and into column 3 at a rate 35 l/h, and the residue fraction was eluted from columns 2 and 3.

Step 5: Recycling in columns 1 and 2 at a rate 110 l/h and in column 3 at a rate 25 l/h.

After the sequence was completed, the process control program was continued and it returned to step 1. By repeating this sequence five to seven times, an equilibrium was reached in the system. The run was continued in a state of equilibrium, and product fractions with a constant composition were recovered and analyzed.

TABLE 3

Volumes of feeds, recycled liquid and product fractions (1)

| | Step No. | | | | |
|---|---|---|---|---|---|
| | 1 | 2 | 3 | 4 | 5 |
| Molasses feed | 18 | — | — | — | — |
| Water feed | 33.3 | 5.0 | 13.0 | 34.0 + 10.0 | — |
| Residue | 18 | 5.0 | — | — | — |

TABLE 3-continued

Volumes of feeds, recycled liquid and product fractions (1)

| | Step No. | | | | |
|---|---|---|---|---|---|
| | 1 | 2 | 3 | 4 | 5 |
| fraction from column 1 | | | | | |
| Residue fraction from column 2 or 3 | — | — | — | 34.0 + 10.0 | — |
| Betaine fraction | — | — | 13.0 | — | — |
| Recycle fraction | 7.3 | — | — | — | — |
| Sucrose fraction | 26.0 | — | — | — | — |
| Recycled solution | — | 6.0 | 26.0 | — | 44.0 + 5.0 |

Table 3 shows the volumes of the feeds, recycled solution and product fractions, and Table 4 shows the compositions of molasses and the product fractions on a dry solids (dry substance) (ds) basis. Table 5 shows the colours of the molasses, residues and product fractions.

TABLE 4

Compositions of feed and product fractions

| | Dry solids (kg/l) | Sucrose (% by weight ds) | Betaine (% by weight ds) | Other substances (% by weight ds) |
|---|---|---|---|---|
| Molasses feed | 0.760 | 57.1 | 5.4 | 37.5 |
| Residue fraction | 0.069 | 18.7 | 6.8 | 74.5 |
| Betaine fraction | 0.048 | 5.3 | 47.5 | 47.2 |
| Sucrose fraction | 0.264 | 89.4 | 1.0 | 9.6 |

TABLE 5

Colours of molasses and product fractions

| | colour ICUMSA | residue 1 | residue 2 | residue 3 |
|---|---|---|---|---|
| Example 1 | | | | |
| Molasses | 47700 | | | |
| Residue | 115400 | 123600 | 151000 | 43324 |
| Betaine | 29900 | | | |
| Sucrose | 2100 | | | |
| Example 2 | | | | |
| Molasses | 38250 | | | |
| Residue | 92500 | 136000 | 240600 | 25900 |
| Betaine | 21800 | | | |
| Sucrose | 4300 | | | |

EXAMPLE 3

Separation of Sucrose and Betaine with 3 Loops

Figure 3:
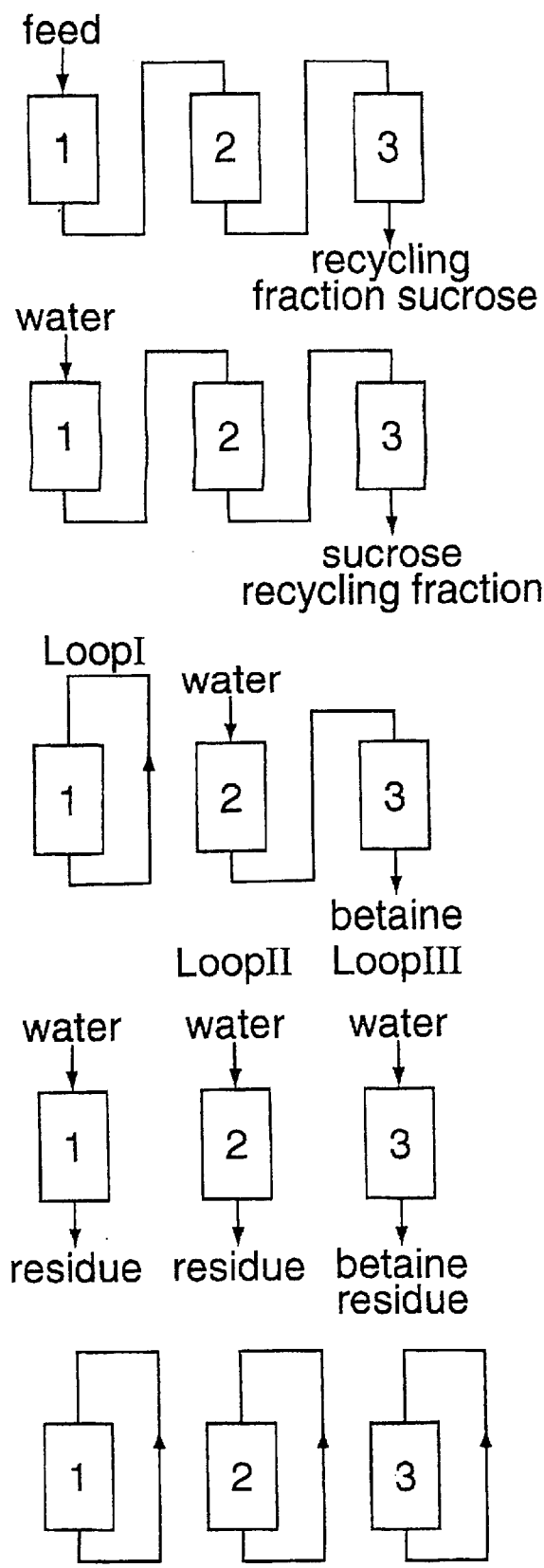
FIG. 3 shows a flow chart of the pilot plant of Example 3.

A pilot plant scale chromatographic test apparatus was employed. The apparatus included three columns, feed pumps, recycling pumps, eluent water pumps, flow and pressure regulators, and inlet and outlet valves for the different process streams. The flowchart of the method of Example 3 is shown in FIG. 3.

The columns were packed with a strongly acid cation exchange resin (such as sold under the brand name of "Finex"). The resin had a polystyrene/divinylbenzene backbone and was activated with sulphonic acid groups; the mean spherule size was about 0.36 mm. The resin had a DVB content of 5.5%. Initially the resin had been regenerated to sodium form, and during the run it was balanced with cations from the feed molasses.

| Test Conditions | |
|---|---|
| Test conditions | |
| Diameter of column | 200 mm |
| Height of resin bed: columns 1, 2, and 3 | 5000 mm |
| Temperature | 75 degrees C. |
| Flow rates | 22, 35, 40, 45, 70, 75 l/h |

The feed solution comprised of beet molasses wherefrom calcium had been removed by adding sodium carbonate (pH 9) and filtering the precipitate off using diatomaceous earth as an aid.

The separation of sucrose and betaine was performed by a five-step sequence in which each column had its specific function. As shown in FIG. 3, step 3 comprised one recycling phase and step 5 three recycling phases. The duration of the sequence was 111 minutes and the sucrose yield was 81.9% (on the amount of sucrose fed).

Step 1: Molasses was fed into column 1 at a flow rate 35 l/h, and the recycling fraction and sucrose fraction were eluted from column 3.

Step 2: Water was fed into column 1 at a flow rate 70 l/h and the sucrose and recycling fractions were eluted from column 3.

Step 3: Recycling in column 1 at a flow rate 70 l/h; simultaneously water was supplied to column 2 at a flow rate 40 l/h and the betaine fraction was eluted from column 3.

Step 4: Water was fed into columns 1, 2 and 3 at flow rates 70, 75 and 40 l/h, the residue fractions were eluted from columns 1, 2 and 3, and the elution of the betaine fraction was continues from column 3.

Step 5: Recycling in columns 1, 2 and 3 at flow rates 22, 75 and 45 l/h.

After the sequence was completed, the process control program was continued and it returned to step 1. By repeating this sequence five to seven times, an equilibrium was reached in the system. The run was continued in a state of equilibrium, and product fractions with a constant composition were recovered and analyzed.

Table 6 shows the volumes of the feeds, recycled solutions and product fractions, and Table 7 shows the compositions of the molasses and product fractions.

TABLE 6

Volumes of feeds recycled liquid and product fractions

| | Step No. | | | | |
|---|---|---|---|---|---|
| | 1 | 2 | 3 | 4 | 5 |
| Molasses feed | 20 | | | | |
| Water feed | | 20 | 10 | 20 + 26 + 20 | |
| Residue fraction from column 1 | | | | 26 | |
| Residue fraction from column 2 | | | | | |

TABLE 6-continued

Volumes of feeds recycled liquid and product fractions

| | Step No. | | | | |
|---|---|---|---|---|---|
| | 1 | 2 | 3 | 4 | 5 |
| 1 from column | | | | 26 | |
| 2 from column 3 | | | | 15 | |
| Betaine fraction | 9 | 4 | | | |
| Recycle fraction | | | 10 | 5 | |
| Sucrose fraction | 11 | 16 | | | |
| Recycled solution | | | 8 | | 11 + 12 + 11 |

TABLE 7

Compositions of feed and product fractions

| | Dry solids (kg/l) | Sucrose (% by weight ds) | Betaine % by weight ds) | Other substances (% by weight ds) |
|---|---|---|---|---|
| Molasses feed | 0.754 | 59.6 | 5.6 | 34.8 |
| Residue fraction | 0.081 | 16.7 | 8.8 | 74.5 |
| Betaine fraction | 0.071 | 45.9 | 22.9 | 31.2 |
| Sucrose fraction | 0.252 | 92.7 | 0.7 | 6.6 |

EXAMPLE 4

Xylose Recovery from Sulphite Cooking Liquor with 2 Loops

Figure 4:
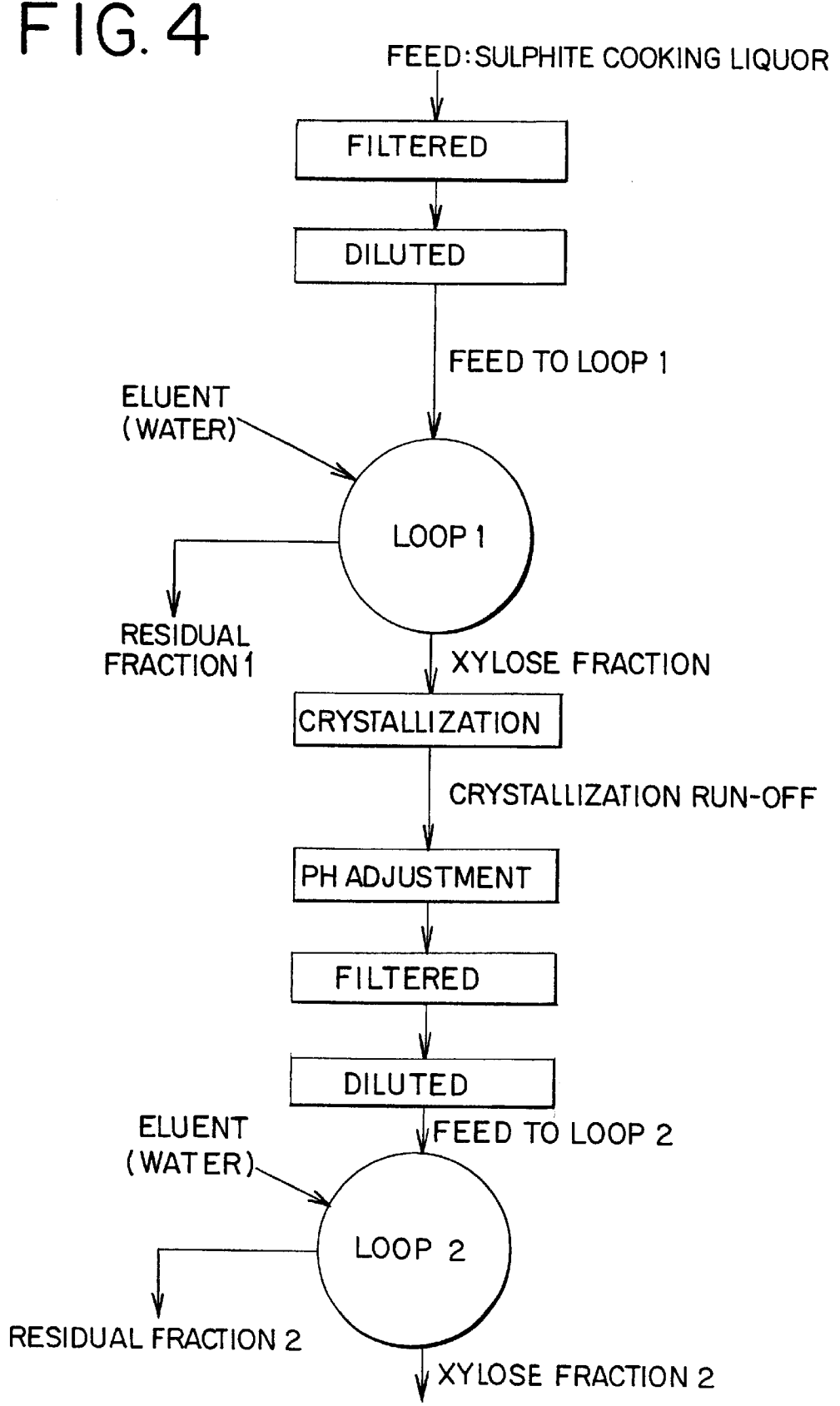
FIG. 4 shows a flow chart of the pilot plant of Example 4.

A flow chart of the method of Example 4 is shown in FIG. 4. The test equipment included two simulated moving bed (SMB) column sets. In the first loop, a continuous SMB was used to separate xylose from sulphite cooking liquor. A xylose enriched fraction from the first loop was subjected to the crystallization. In the second loop, a sequential SMB was used to separate xylose from crystallization run-off.

The first loop comprised a continuous SMB, with 8 columns connected in series. The first loop also had a feed pump, circulation pumps, and an eluent water pump, as well as inlet and product valves for the various process streams. The height of each column in Loop 1 was 2.5 m and each column in Loop 1 had a diameter of 0.2 m. The columns in Loop 1 were packed with a strong acid gel type ion exchange resin in $Mg^{2+}$-form. The mean bead size in Loop 1 was 0.36 mm and the divinylbenzene content was 6.5% in Loop 1.

The second loop comprised a sequential SMB, with 5 columns connected in series. The second loop also had a feed pump, two circulation pumps, and an eluent water pump, as well as inlet and product valves for the various process streams. The height of first three columns in Loop 2 was 3.6 m and the height of last two columns in Loop 2 was 4.6 m. Each column in Loop 2 had a diameter of 0.111 m. The columns in Loop 2 were packed with a strong acid gel type ion exchange resin in $Mg^{2+}$-form. The mean bead size in Loop 2 was 0.36 mm and the divinylbenzene content was 5.5% in Loop 2.

The feed to the first loop was sulphite cooking liquor from an Mg 2+-based cooking process with the expectation to separate the xylose contained therein. The sulphite cooking liquor was filtered using diatomaceous earth and diluted to a concentration of 47 weight %. The pH of the sulphite cooking liquor was 3.5. The sulphite cooking liquor had the composition set forth below in Table 8, whereby the percentages are indicated by weight on a dry substance (ds) basis.

TABLE 8

| Composition of Loop 1 Feed | % on ds |
|---|---|
| Xylose | 14.2 |
| Glucose | 2.0 |
| Galactose + Rhamnose | 1.6 |
| Mannose | 1.6 |
| Xylonic acid | 5.8 |
| Others | 74.8 |

The fractionation of the sulphite cooking liquor in the first loop was performed by way of a 8-step continuous SMB sequence as set forth below. The feed was at a temperature of 65 degrees C. and water was used as an eluent. The duration of each step was 13 minutes and 51 seconds and basic flow rate for the circulation in Loop 1 was set to 112 l/h.

Step 1: Continuously, eluent was pumped into column 1 of Loop 1 at a flow rate of 81 l/h and feed solution was pumped into column 6 of Loop 1 at a flow rate of 44 l/h. A xylose-containing fraction was withdrawn from column 3 of Loop 1 at a flow rate of 24 l/h and residual fraction withdrawn from column 7 of Loop 1 at a flow rate of 101 l/h. Simultaneously, circulation pumps provided a basic flow rate of 112 l/h for Loop 1.

Step 2: Continuously, eluent was pumped into column 2 of Loop 1 at a flow rate of 81 l/h and feed solution was pumped into column 7 of Loop 1 at a flow rate of 44 l/h. A xylose-containing fraction was withdrawn from column 4 of Loop 1 at a flow rate of 24 l/h and residual fraction was withdrawn from column 8 of Loop 1 at a flow rate of 101 l/h. Simultaneously, circulation pumps provided a basic flow rate of 112 l/h for Loop 1.

Step 3: Continuously, eluent was pumped into column 3 of Loop 1 at a flow rate of 81 l/h and feed solution was pumped into column 8 of Loop 1 at a flow rate of 44 l/h. A xylose-containing fraction was withdrawn from column 5 of Loop 1 at a flow rate of 24 l/h and residual fraction was withdrawn from column 1 at a flow rate of 101 l/h. Simultaneously, circulation pumps provided a basic flow rate of 112 l/h for Loop 1.

Step 4: Continuously, eluent was pumped into column 4 of Loop 1 at a flow rate of 81 l/h and feed solution was pumped into column 1 of Loop 1 at a flow rate of 44 l/h. A xylose-containing fraction was withdrawn from column 6 of Loop 1 at a flow rate of 24 l/h and residual fraction was withdrawn from column 2 of Loop 1 at a flow rate of 101 l/h. Simultaneously, circulation pumps provided a basic flow rate of 112 l/h for Loop 1.

Step 5: Continuously, eluent was pumped into column 5 of Loop 1 at a flow rate of 81 l/h and feed solution was pumped into column 2 of Loop 1 at a flow rate of 44 l/h. A xylose-containing fraction was withdrawn from column 7 of Loop 1 at a flow rate of 24 l/h and residual fraction was withdrawn from column 3 of Loop 1 at a flow rate of 101 l/h. Simultaneously, circulation pumps provided a basic flow rate of 112 l/h for Loop 1.

Step 6: Continuously, eluent was pumped into column 6 of loop 1 at a flow rate of 81 l/h and feed solution was pumped into column 3 of Loop 1 at a flow rate of 44 l/h. A xylose-containing fraction was withdrawn from column 8 of Loop 1 at a flow rate of 24 l/h and residual fraction was withdrawn from column 4 of Loop 1 at a flow rate of 101 l/h. Simultaneously, circulation pumps provided a basic flow rate of 112 l/h for Loop 1.

Step 7: Continuously, eluent was pumped into column 7 at a flow rate of 81 l/h and feed solution was pumped into column 4 at a flow rate of 44 l/h. A xylose-containing fraction was withdrawn from column 1 at a flow rate of 24 l/h and residual fraction was withdrawn from column 5 at a flow rate of 101 l/h. Simultaneously, circulation pumps provided a basic flow rate of 112 l/h for Loop 1.

Step 8: Continuously eluent was pumped into column 8 at a flow rate of 81 l/h and feed solution was pumped into column 5 at a flow rate of 44 l/h. A xylose-containing fraction was withdrawn from column 2 at a flow rate of 24 l/h and residual fraction was withdrawn from column 6 at a flow rate of 101 l/h. Simultaneously, circulation pumps provided a basic flow rate of 112 l/h for Loop 1.

After equilibration of the system, the following fractions were drawn from Loop 1 of the system: Residual fraction from all columns and xylose-containing fraction from all columns. The results including HPLC analyses for combined residual and xylose fractions from Loop 1 are set forth in Table 9 below.

TABLE 9

|  | Xylose | Residual |
|---|---|---|
| Volume, l | 44.0 | 184.8 |
| Dry solids, g/100 ml | 30.7 | 19.1 |
| Xylose, % on ds | 48.5 | 1.5 |
| Glucose, % on ds | 5.3 | 1.0 |
| Galactose + Rhamnose, % on ds | 5.1 | 0.4 |
| Mannose, % on ds | 5.3 | 0.3 |
| Xylonic acid, % on ds | 10.9 | 3.6 |
| Others, % on ds | 24.9 | 93.2 |

The overall xylose yield calculated from these fractions was 92.5%.

The xylose-containing fraction from Loop 1 was subjected to the crystallization. The crystallization run-off was then used as a Loop 2 feed, with the objective to separate xylose contained therein.

The pH of the Loop 2 feed liquor (crystallization run-off) was adjusted with MgO to 3.6. The Loop 2 feed liquor was then filtered using diatomaceous earth and diluted to a concentration of 47 weight %. The Loop 2 feed had the composition as set forth in Table 10 below, whereby the percentages are indicated by weight on a dry solids (dry substance) (ds) basis.

TABLE 10

| Composition of Loop 2 feed | % on ds |
|---|---|
| Xylose | 24.7 |
| Glucose | 5.2 |
| Galactose + Rhamnose | 6.6 |
| Mannose | 8.8 |
| Xylonic acid | 17.7 |
| Others | 37.0 |

The fractionation in Loop 2 was performed by way of a 9-step sequential SMB sequence as set forth below. The feed in Loop 2 was used at a temperature of 65 degrees C. Water was used as an eluent in Loop 2.

Step 1: 3.0 l of feed solution was pumped into the first column of Loop 2 at a flow rate of 40 l/h and xylose-containing fraction was collected from column 5 of Loop 2.

Step 2: 8.0 l of feed solution was pumped into the first column at a flow rate of 46 l/h and a residual fraction was collected from the same column. Simultaneously, 3.0 l of water was pumped into the second column of Loop 2 at a flow rate of 40 l/h and xylose-containing fraction was collected from the column 5 of Loop 2.

Step 3: 2.0 l of water were pumped into the second column of Loop 2 at a flow rate of 18 l/h and a residual fraction was collected from column 4 of Loop 2. Simultaneously, 5.0 l of water were pumped into column 5 of Loop 2 at a flow rate of 49 l/h and xylose-containing fraction was collected from the same column.

Step 4: 10.0 l of water was pumped into column 5 of Loop 2 at a flow rate of 45 l/h and a residual fraction was collected from column 4 of Loop 2.

Step 5: 8.4 l of water were pumped into column 3 of Loop 2 at a flow rate of 45 l/h and a residual fraction was collected from column 2 of Loop 2.

TABLE 11

|  | Xylose | Residual |
|---|---|---|
| Volume, l | 11.0 | 56.0 |
| Dry solids, g/100 ml | 27.5 | 5.8 |
| Xylose, % on ds | 45.5 | 8.2 |
| Glucose, % on ds | 5.4 | 8.0 |
| Galactose + Rhamnose, % on ds | 10.6 | 4.1 |
| Mannose, % on ds | 14.2 | 5.1 |
| Xylonic acid, % on ds | 6.8 | 28.5 |
| Others, % on ds | 17.5 | 46.1 |

The overall xylose yield by percentage (%) weight on a dry solids (dry substance) (ds) basis calculated from these fractions was 83.8%.

A comparison of the feeds into and fractions obtained from Loops 1 and 2 by percentage (%) weight on a dry solids (dry substance) (ds) basis in Example 4 are set forth in Table 12 below.

TABLE 12

|  | Loop 1 Feed: Sulphite Cooking Liquor | Loop 1 Xylose Fraction | Loop 1 Residual Fraction | Loop 2 Feed: Crystallization Run-Off | Loop 2 Xylose Fraction | Loop 2 Residual Fraction |
|---|---|---|---|---|---|---|
| Xylose | 14.2 | 48.5 | 1.5 | 24.7 | 45.5 | 8.2 |
| Glucose | 2.0 | 5.3 | 1.0 | 5.2 | 5.4 | 8.0 |
| Galactose + Rhamnose | 1.6 | 5.1 | 0.4 | 6.6 | 10.6 | 4.1 |
| Mannose | 1.6 | 5.3 | 0.3 | 8.8 | 14.2 | 5.1 |
| Xylonic acid | 5.8 | 10.9 | 3.6 | 17.7 | 6.8 | 28.5 |

Feed (Loop 1): Suphite cooking liquor from $Mg^{2+}$-based cooking process filtered with diatomaceous earth diluted to 47% weight dry solids (dry substance) (ds)
Feed (Loop 2): Crystallization run-off of crystallized xylose fraction from Loop 1 filtered with diatomaceous earth diluted to 47% weight dry solids (dry substance) (ds) pH adjusted with MgO to 3.6
Xylose yield from Loop 1 was 92.5%
Xylose yield from Loop 2 was 83.8%

Step 6: 2.5 l was circulated at a flow rate of 45 l/h in Loop 2.

Step 7: 9.0 l of water were pumped into the first column of Loop 2 at a flow rate of 50 l/h and a residual fraction was collected from column 5 of Loop 2.

Step 8: 11.1 l of water were pumped into the first column of Loop 2 at a flow rate of 63 l/h and a residual fraction was collected from column 3 of Loop 2. Simultaneously, 7.5 l of water was pumped into the column 4 of Loop 2 at a flow rate of 41 l/h and a residual fraction was collected from the column 5 of Loop 2.

Step 9: 8.5 l were circulated at a flow rate of 50 l/h in Loop 2.

After equilibration of the system, the following fractions were with drawn from Loop 2 of the system: Residual fractions from all columns and xylose-containing fractions from column 5 of Loop 2. The results including HPLC analyses for combined fractions are set forth in Table 11 below.

EXAMPLE 5

Sucrose and Betaine Recovery from Molasses with 2 Loops

Figure 5:
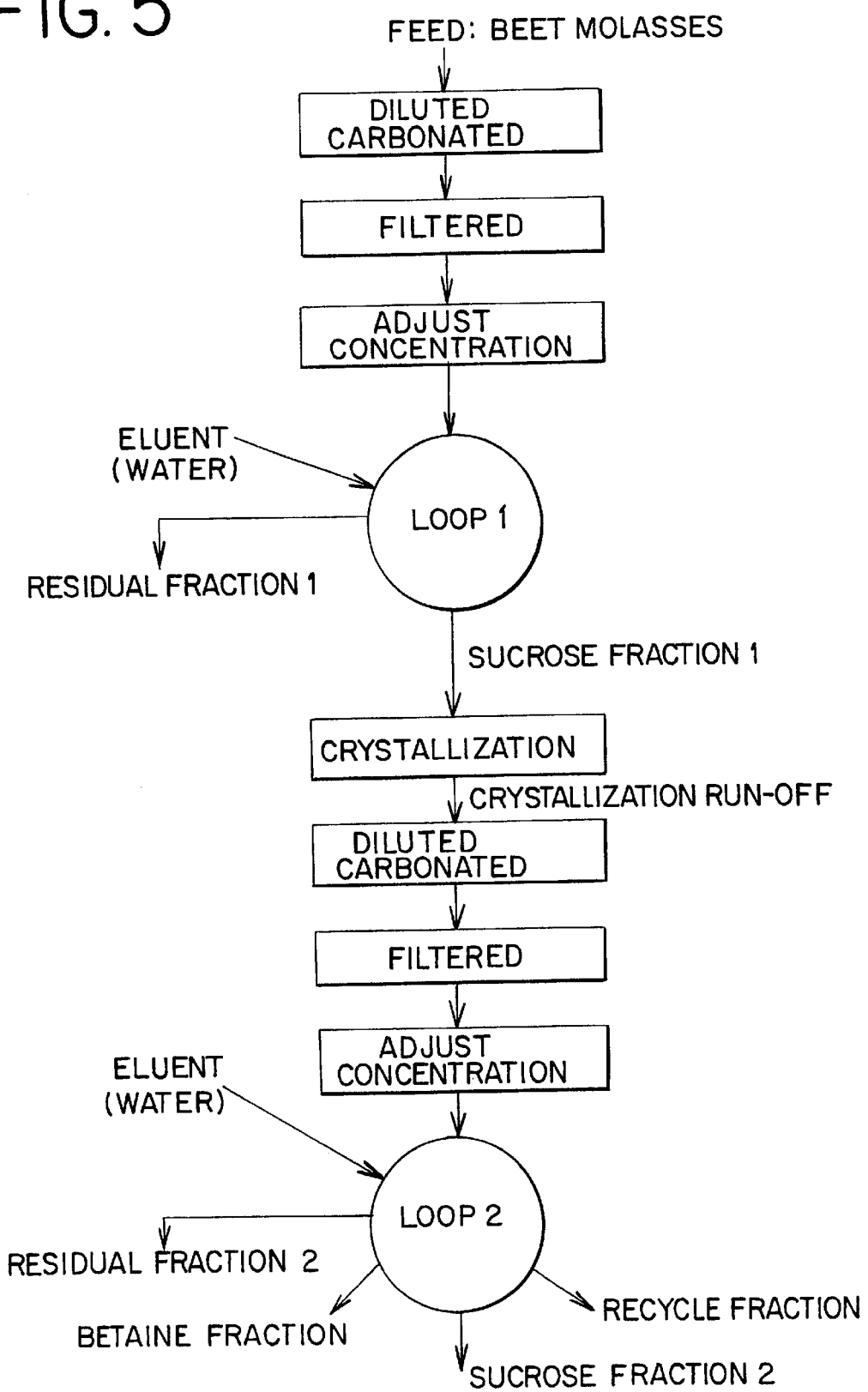
FIG. 5 show a flow chart of the pilot plant of Example 5.

A flow chart of the method of Example 5 is shown in FIG. 5. The test equipment included two simulated moving bed (SMB) column sets. In the first loop, a continuous SMB was used to separate sucrose from molasses. A sucrose-enriched fraction from the first loop was subjected to crystallization. In the second loop, a sequential SMB was used to separate sucrose and betaine from crystallization run-off.

The first loop comprised a continuous SMB with 8 columns connected in series. The first loop also had a feed pump, circulation pumps, and an eluent water pump, as well as inlet and product valves for the various process streams. The height of each column in the first loop was 2.5 m and each column in the first loop has a diameter of 0.2 m. The columns in Loop 1 were packed with a strong acid gel type ion exchange resin in $Na^+$-form in Loop 1. The mean bead size was 0.36 mm and the divinylbenzene content was 6.5%.

The second loop comprised a sequential SMB, with 4 columns connected in series. The second loop had a feed pump, circulation pumps, and an eluent water pump, as well as inlet and product valves for the various process streams. The height of each column in Loop 2 was 5 m. Each column in Loop 2 had a diameter of 0.111 m. The columns in Loop 2 were packed with a strong acid gel type ion exchange resin in Na$^+$-form. In Loop 2 the mean bead size was 0.36 mm and the divinylbenzene content was 6.5%.

The feed to Loop 1 was beet molasses with the objective to separate the sucrose contained therein. The molasses was diluted to 60 Bx and carbonated with sodium carbonate (1.5% on ds basis, temperature 60 degrees C., 3 h reaction time). The carbonated solution was then filtered with a Seitz pressure filter using Kenite 300 as a filtering aid (precoat 1 kg/m$^2$, bodyfeed 0.5% on ds basis). The feed concentration was adjusted to 77.2 g/100 ml. The composition of the feed to Loop 1 is set forth in Table 13 below, whereby the percentages are indicated by weight on a dry substance (ds) basis.

TABLE 13

| Composition of Loop 1 feed | |
|---|---|
| pH | 9.0 |
| Concentration, g/100 ml | 77.2 |
| Sucrose, % on ds | 74.8 |
| Betaine, % on ds | 2.4 |
| Others, % on ds | 22.8 |

The fractionation of the beet molasses in Loop 1 was performed by way of a 8-step continuous SMB sequence as set forth below. The feed (beet molasses) was at a temperature of 80° C. Water was used as an eluent in Loop 1. The duration of each step was 9 minutes and 15 seconds in Loop 1 and basic flow rate for the circulation was set to 163 l/h in Loop 1.

Step 1: Continuously, eluent was pumped into the column 1 of Loop 1 at a flow rate of 119 l/h and feed solution was pumped into the column 6 of Loop 1 at a flow rate of 21 l/h. A sucrose-containing fraction was withdrawn from column 2 of Loop 1 at a flow rate of 33 l/h and residual fraction was withdrawn from the column 7 of Loop 1 at a flow rate of 107 l/h. Simultaneously, circulation pumps provided a basic flow rate of 163 l/h for Loop 1.

Step 2: Continuously, eluent was pumped into the column 2 of Loop 1 at a flow rate of 119 l/h and feed solution was pumped into the column 7 of Loop 1 at a flow rate of 21 l/h. A sucrose-containing fraction was withdrawn from column 3 of Loop 1 at a flow rate of 33 l/h and residual fraction was withdrawn from column 8 of Loop 1 at a flow rate of 107 l/h. Simultaneously, circulation pumps provided a basic flow rate of 163 l/h for Loop 1.

Step 3: Continuously eluent was pumped into the column 3 of Loop 1 at a flow rate of 119 l/h and feed solution was pumped into the column 8 at a flow rate of 21 l/h. A sucrose-containing fraction was withdrawn from column 4 of Loop 1 at a flow rate of 33 l/h and residual fraction was withdrawn from column 1 of Loop 1 at a flow rate of 107 l/h. Simultaneously, circulation pumps provided a basic flow rate of 163 l/h for Loop 1.

Step 4: Continuously, eluent was pumped into column 4 of Loop 1 at a flow rate of 119 l/h and feed solution was pumped into the column 1 of Loop 1 at a flow rate of 21 l/h. A sucrose-containing fraction was withdrawn from column 5 of Loop 1 at a flow rate of 33 l/h and residual fraction was withdrawn from column 2 of Loop 1 at a flow rate of 107 l/h. Simultaneously, circulation pumps provided a basic flow rate of 163 l/h for Loop 1.

Step 5: Continuously, eluent was pumped into the column 5 of Loop 1 at a flow rate of 119 l/h and feed solution was pumped into the column 2 of Loop 1 at a flow rate of 21 l/h. A sucrose-containing fraction was withdrawn from column 6 of Loop 1 at a flow rate of 33 l/h and residual fraction was withdrawn from column 3 of Loop 1 at a flow rate of 107 l/h. Simultaneously, circulation pumps provided a basic flow rate of 163 l/h for Loop 1.

Step 6: Continuously, eluent was pumped into column 6 of Loop 1 at a flow rate of 119 l/h and feed solution was pumped into the column 3 of Loop 1 at a flow rate of 21 l/h. A sucrose-containing fraction was withdrawn from column 7 of Loop 1 at a flow rate of 33 l/h and residual fraction was withdrawn from column 4 of Loop 1 at a flow rate of 107 l/h. Simultaneously, circulation pumps provided a basic flow rate of 163 l/h for Loop 1.

Step 7: Continuously, eluent was pumped into the column 7 of Loop 1 at a flow rate of 119 l/h and feed solution was pumped into the column 4 of Loop 1 at a flow rate of 21 l/h. A sucrose-containing fraction was withdrawn from column 8 of Loop 1 at a flow rate of 33 l/h and residual fraction was withdrawn from column 5 of Loop 1 at a flow rate of 107 l/h. Simultaneously, circulation pumps provided a basic flow rate of 163 l/h for Loop 1.

Step 8: Continuously, eluent was pumped into the column 8 of Loop 1 at a flow rate of 119 l/h and feed solution was pumped into the column 5 of Loop 1 at a flow rate of 21 l/h. A sucrose-containing fraction was withdrawn from column 1 of Loop 1 at a flow rate of 33 l/h and residual fraction was withdrawn from column 6 of Loop 1 at a flow rate of 107 l/h. Simultaneously, circulation pumps provided a basic flow rate of 163 l/h for Loop 1.

After equilibration of the system, the following fractions were drawn from Loop 1 of the system: Residual fraction from all columns and sucrose-containing fraction from all columns. The results including HPLC analyses for combined residual and sucrose fractions are set forth in Table 14 below.

TABLE 14

| Fractions | Sucrose | Residual |
|---|---|---|
| Volume, l | 41.0 | 132.0 |
| Concentration, g/100 ml | 37.4 | 3.6 |
| Sucrose, % on ds | 91.4 | 21.0 |
| Betaine, % on ds | 1.5 | 5.4 |
| Others, % on ds | 7.1 | 73.6 |

The overall sucrose yield by weight on a dry solids (dry substance) (ds) basis calculated from these fractions was 93.4% and betaine recovery to the sucrose fraction was 47.3% by weight on a dry solids (dry substance) (ds) basis.

The sucrose-containing fraction from the first loop was subjected to crystallization. The crystallization run-off was used as a feed to Loop 2 with the objection to separate sucrose and betaine contained therein.

The Loop 2 feed (crystallization run-off) was diluted to 65 Bx and carbonated with sodium carbonate (1.5% on ds basis, temperature 60 degrees C., 3 h reaction time). The carbonated solution was then filtered with a Seitz pressure filter using Kenite 300 as a filtering aid (precoat 1 kg/m$^2$, bodyfeed 0.5% on ds basis). The feed concentration was adjusted to 62 g/100 ml. The composition of the feed (crystallization run-off) into Loop 2 is set forth in Table 15 below, whereby the percentages are indicated by weight on a dry solids (dry substance) (ds) basis.

TABLE 15

Composition of loop 2 feed

| | |
|---|---|
| pH | 9.2 |
| Concentration, g/100 ml | 62.0 |
| Sucrose, % on ds | 64.9 |
| Betaine, % on ds | 6.2 |
| Others, % on ds | 28.9 |

The fractionation in Loop 2 was performed by way of a 8-step sequential SMB sequence as set forth below. The feed in Loop 2 was at a temperature of 80° C. Water was used as an eluent in Loop 2.

Step 1: 4.0 l of feed solution was pumped into the first column of Loop 2 at a flow rate of 40 l/h and a recycle fraction was collected from column 4 of Loop 2.

Step 2: 7.5 l of feed solution was pumped into the first column of Loop 2 at a flow rate of 40 l/h and a residual fraction was collected from the same column. Simultaneously, 2.5 l of water was pumped into the second column of Loop 2 at a flow rate of 50 l/h and a sucrose containing fraction was collected from column 4 of Loop 2.

Step 3: 10.5 l of water was pumped into the second column of Loop 2 at a flow rate of 77 l/h and a residual fraction was collected from column 3 of Loop 2. Simultaneously, 11.5 l of water was pumped into column 4 of Loop 2 and a sucrose-containing fraction was collected from the same column.

Step 4: 4.0 l was circulated at a flow rate of 45 l/h.

Step 5: 11.5 l of water was pumped into column 1 of Loop 2 at a flow rate of 45 l/h and a betaine-containing fraction was collected from column 4 of Loop 2.

Step 6: 7.5 l of water was pumped into column 1 of Loop 2 at a flow rate of 45 l/h and a residual fraction was collected from column 2 of Loop 2. Simultaneously, 11 l of water was pumped into column 3 of loop 2 at a flow rate of 60 l/h. A first 2.0 l betaine-containing fraction was collected from column 4 of Loop 2 and then 9.0 l of residual fraction was collected from column 4 of Loop 2.

Step 7: 2.5 l of water was pumped into column 3 of Loop 2 at a flow rate of 50 l/h and a residual fraction was collected from column 2 of Loop 2.

Step 8: 9.0 l was circulated at a flow rate of 50 l/h in Loop 2.

After equilibration of the system, the following fractions were withdrawn from Loop 2 of the system: Residual fraction from all columns, sucrose-containing fractions from column 4 of Loop 2, recycle fraction from column 4 of Loop 2, and betaine-containing fractions from column 4 of Loop 2. The results including HPLC analyses for combined fractions are set forth in Table 16 below.

TABLE 16

| Fractions | Sucrose | Betaine | Recycle | Residual |
|---|---|---|---|---|
| Volume, l | 14.0 | 13.5 | 4.0 | 37.0 |
| Concentration, g/100 ml | 30.1 | 4.5 | 18.5 | 4.2 |
| Sucrose, % on ds | 93.9 | 0.9 | 63.6 | 12.4 |
| Betaine, % on ds | 0.1 | 68.4 | 0.0 | 1.5 |
| Others, % on ds | 6.0 | 30.7 | 36.4 | 86.1 |

The overall yield calculated from the product fractions by percentage (%) weight on a dry solids (dry substance) (ds) basis was 95.2% for sucrose and 93.8% for betaine.

A comparison of the feeds into and fractions obtained from Loops 1 and 2 by percentage (%) weight on a dry solids (dry substance) (ds) basis in Example 5 are set forth in Table 17 below.

TABLE 17

| | Loop 1 Feed: Beet Molasses | Loop 1 Sucrose Fraction | Loop 1 Residual Fraction | Loop 2 Feed: crystallization Run-off | Loop 2 Sucrose Fraction | Loop 2 Betaine Fraction | Loop 2 Recycle Fraction | Loop 2 Residual Fraction |
|---|---|---|---|---|---|---|---|---|
| Sucrose | 74.8 | 91.4 | 21.0 | 64.9 | 93.9 | 0.9 | 63.6 | 12.4 |
| Betaine | 2.4 | 1.5 | 5.4 | 6.2 | 0.1 | 68.4 | 0 | 1.5 |

| | |
|---|---|
| Feed (Loop 1): | Beet Molasses diluted/carbonated filtered concentration adjusted |
| Feed (Loop 2): | Crystallization run-off of crystallized sucrose fraction from Loop 1 diluted/carbonated filtered concentration adjusted |
| Sucrose yield from Loop 1: | 93.4% |
| Sucrose yield for Loops 1 and 2: | 95.2% |
| Betaine yield from Loops 1 and 2: | 93.8% |

Betaine can be crystallized by the methods described in the following examples, as well as by other methods.

EXAMPLE 6

Crystallization of Betaine

A betaine solution was produced by combining the betaine fractions from Loop 2 of Example 5. The combined betaine fractions were concentrated by evaporation to produce a yield of 93.8% on a dry solids (dry substance) (ds) basis. The solution comprising the combined betaine fraction is preferably crystallized, such as by the crystallization method of Example 2 of U.S. Pat. No. 4,539,430. The concentrated solution obtained was seeded with betaine crystals and anhydrous betaine was crystallized at a temperature ranging from 75–85 degrees C. under a vacuum of about 100 millibar. The yield of betaine crystals was about 55% and the purity of the crystals was about 99%. The crystallization was carried out in a conventional sugar crystallizer with forced circulation. The crystallization time was about 6 hours. The crystals were separated from the mother liquor be centrifugation in a conventional sugar centrifuge. The run off syrup was evaporated and by crystallization at a temperature ranging from about 80–90 degrees C. and at a vacuum of 60–100 millibar, an additional amount of betaine anhydride crystals was recovered. The yield for this crystallization step was about 48% and the purity of the crystals 98%. The crystallization time was about 8 hours. The run off syrup from the centrifugation of the crystals from this second crystallization was recycled to the feed solution of the chromatographic separation. In order to produce pharmaceutical grade betaine monohydrate, the anhydrous betaine crystals obtained were dissolved in water to provide a 60% by weight solution of solids. The solution obtained was purified by treatment with activated carbon followed by filtration. From the purified solution, betaine monohydrate was crystallized at about 80 degree C. The yield was 55%, and the purity of the betaine crystals was almost 100%. The run off syrup was recycled as feed for crystallization.

EXAMPLE 7

Crystallization of Betaine

Combining the betaine fractions from Loops 2 as in Example 6 produced a combined betaine solution. The combined betaine solution was concentrated by evaporation to produce a yield of 93.8% on a dry solids (dry substance) (ds) basis. The combined solution comprising the combined betaine fractions are also preferably crystallized, such as by the crystallization method of Example 3 of U.S. Pat. No. 4,539,430. The concentrated solution obtained was seeded and anhydrous betaine was crystallized as in Example 6. The crude anhydrous betaine crystals were dissolved in water and the solution subjected to conventional color removal and filtration. From the purified solution, betaine monohydrate was crystallized. The yield was 72 kg betaine anhydride and 100 kg betaine monohydrate (anhydrous basis).

What is claimed is:

1. A method for processing molasses selected from the group consisting of beet molasses, cane molasses, stillage, vinasse, wood molasses, biomass molasses, wheat molasses, barley molasses, corn molasses, and solutions derived from any of the preceding, comprising:

recovering at least one product during processing of molasses in two or more loops, each loop comprising one or more chromatographic beds, columns, or parts thereof separate and distinct from the other loop, and said loops comprising at least a first loop and a second loop;

said processing comprising at least one of the following phases: a feeding phase, an eluting phase and a recycling or circulation phase, wherein liquid present in each loop comprises a separate defined dry solids (dry substance) profile, and said dry solids profile is recycled; said processing of molasses further comprising fractionating a feed solution comprising said molasses in said first loop into at least two fractions by a chromatographic simulated moving bed process (SMB);

crystallizing at least one of said fractions from said first loop to form a crystallized fraction and crystallization run-off;

fractionating a solution derived from said crystallization run-off in said second loop by chromatographic fractionation into at least two other fractions; and wherein at least one of said fractions comprises a product fraction, said product fraction comprising a greater percentage concentration by weight on a dry solids (dry substance) basis of said product than said feed solution comprising said molasses, and said product fraction comprising a greater percentage concentration by weight on a dry solids (dry substance) basis of said product than said solution derived from said crystallization run-off.

2. A method claimed as in claim 1 wherein at least some of said phases during said processing of said molasses occurring sequentially, continuously, or simultaneously.

3. A method as claimed in claim 1 wherein phases can be used simultaneously in a same or different beds or loops.

4. A method as claimed in claim 1 wherein contiguous SMB is in the first loop and sequential SMB in the second loop.

5. A method as claimed in claim 1 wherein the crystallizing has been carried out 1–3 times.

6. A method as claimed in claim 1 wherein each loop comprises a series of columns containing a cation exchange resin.

7. A method as claimed in claim 1 wherein:

the simulated moving bed process in said first loop is selected from the group consisting of a continuous simulated moving bed process and a sequential moving bed process;

said solutions derived from molasses are selected from the group consisting of raw juice, diffusion juice, thin juice, thick juice, dilute juice, residual juice, molasses-containing liquid, and molasses-containing juice; and said crystallization run-off comprises mother liquor from the crystallization of one of said fractions from said first loop.

8. A method as claimed in claim 1 wherein the chromatographic fractionation in said second loop comprises a batch method.

9. A method as claimed in claim 1 wherein the chromatographic fractionation in said second loop is selected from the group consisting of a continuous simulated moving bed process and a sequential simulated moving bed process.

10. A method as claimed in claim 1 wherein said product fraction is recovered from said first loop and/or said second loop.

11. A method as claimed in claim 1 wherein said product fraction comprises a sucrose fraction.

12. A method as claimed in claim 1 wherein said product fraction comprises a xylose fraction.

13. A method as claimed in claim 1 wherein one of said fractions comprises a betaine fraction and said betaine fraction comprises a greater percentage concentration of betaine by weight on a dry solids (dry substance) basis than at least one of said other fractions in or from said loops.

14. A method as claimed in claim 1 wherein said first loop is connected in series to said second loop.

15. A method as claimed in claim 1 wherein said crystallizing occurs between the first and second loops.

16. A method as claimed in claim 1 wherein said dry solids (dry substance) profile is recycled in or advanced in all phases.

17. A method as claimed in claim 1 wherein the phases in said loops are the same or different.

18. A method as claimed in claim 1 wherein the loops are open or closed.

19. A method as claimed in claim 1 wherein a solution, liquid, or fraction from one loop is transferred or passed to another loop when the loops are open.

20. A method as claimed in claim 1 wherein each loop is different than the other loop.

21. A method as claimed in claim 1 wherein said wood molasses and said biomass molasses comprise xylan derived material derived from vegetable material.

22. A method as claimed in claim 21 wherein said xylan derived material derived from vegetable matter selected from the group consisting of: wood, wood chips, saw dust, hardwood, birch, aspen, beech, eucalyptus, poplar, alder, alm, softwood, grain, corn, wheat, barley, rice, oat, particulates of grain, straw, stems, hulls, husks, fibers,corn husks, barley husks, oat husks, rice hulls, corn fiber, corn stems, corn cobs, bagasse, almond shells, coconut shells, cotton seed bran and cotton seed hulls.

23. A method according to claim 21 wherein said biomass and wood molasses are obtained by acid hydrolysis or enzymatic hydrolysis of xylan.

24. A method as claimed in claim 1 wherein said biomass molasses comprises biomass hydrolysates derived from biomass.

25. A method as claimed in claim 24 wherein said biomass hydrolysates are obtained by a process selected from the group consisting of: direct acid hydrolysis of said biomass, enzymatic prehydrolysate of molasses obtained from steam exploded biomass or from by acetic acid or steam hydrolysed biomass, acid hydrolysis of prehydrolyzate obtained from steam exploded biomass or from acetic acid or steam hydrolysed biomass, and a sulphite pulping process.

26. A method as claimed in claim 24 wherein said wood molasses and said biomass hydrolysates are selected from the group consisting of: sulphite cooking liquor, spent sulphite pulping liquor, acid spent sulphite liquor, spent liquor from hardwood pulping, spent liquor from softwood pulping before hexoses are removed, spent liquor from softwood pulping after hexoses are removed, spent liquor from digestion of said biomass, spent liquor from hydrolysis of said biomass, spent liquor from solvent-based pulping, spent liquor from ethanol-based pulping, mother liquor from crystallization of xylose, diluted runoff of xylose crystallization from sulphite spent pulping liquor derived solution, waste solution from the paper industry, and waste solution from the pulping industry.

27. A method as claimed in claim 1 wherein said molasses comprises fraction of spent liquor obtained by ultrafiltration or from a side removal during the sulphite cooking.

28. A method as claimed in claim 1 wherein said molasses comprises a xylose solution.

29. A method as claimed in claim 1 wherein said feed solution is pretreated before being fed to said first loop in at least one pretreatment process selected from the group consisting of: filtering, ultrafiltration, heating, chromatography, concentrating, evaporation, neutralization, pH adjustment, dilution, softening by carbonation, and ion exchange.

30. A method as claimed in claim 1 wherein said feed solution comprises one or more compounds selected from the group consisting of: sucrose, betaine, carbohydrates, sugar alcohols, ionic substances, monosaccharides, disaccharides,
pentoses, as, xylose, arabinose etc., hexoses as glucose, galactose, rhamnose, mannose, xylonic acid, lignosulphonates, and oligosaccharides.

31. A method as in claim 1 wherein said solution derived from said crystallization run-off is fed to the second loop after being treated in at least one treatment process selected from the group consisting of: filtering, ultrafiltration, heating, concentrating, evaporation, neutralization, pH adjustment, dilution, softening by carbonation and ion exchange.

32. A method as claimed in claim 1 wherein said fractions are selected from the group consisting of one or more: sucrose fractions, betaine fractions, xylose fractions, residual fractions, and recycled fractions.

33. A method as claimed in claim 1 wherein said fractions comprise one or more compounds selected from the group consisting of: sucrose, betaine, xylose, arabinose, glucose, galactose, rhamnose, mannose, and xylonic acid.

34. A method as claimed in claim 1 wherein each loop contains at least one type of resin.

35. A method as claimed in claim 34 wherein composition of the resin in the first loop is the same as the resin in the second loop.

36. A method as claimed in claim 34 wherein composition of the resin in the first loop is different than the resin in the second loop.

37. A method as claimed in claim 36 wherein one of the resins in one of said loops is in monovalent form and one of the resins in another one of said loops is in divalent form.

38. A method as claimed in claim 36 wherein the resin of the first loop has a different degree of crosslinking than the resin of the second loop.

39. A method as claimed in claim 36 wherein the resin of the second loop comprises a lower crosslinking resin than the resin of the first loop.

40. A method as claimed in claim 34 wherein the resins of the loops have similar or different particles sizes.

41. A method as claimed in claim 1 wherein the loops have similar flow rates.

42. A method as claimed in claim 1 wherein the first and second loops have different flow rates.

43. A method as claimed in claim 1 wherein the pH of the feed solution in the first loop is the same or different than the pH of the solution in the second loop.

44. A method as claimed in claim 1 wherein said first loop is operated as a continuous simulated moving bed (SMB) at sufficient capacity and low dilution to recover improved yield of products.

45. A method as claimed in claim 1 wherein said product fraction is crystallized.

46. A method as claimed in claim 1 wherein at least one of said loop is operated as a sequential simulated moving bed (SMB) to recover products contained in minor amount in solution in said loop.

47. A method as claimed in claim 1 wherein:
one of said loops is operated as a continuous simulated moving bed (SMB);
another one of said loops is operated as a sequential simulated moving bed (SMB); and
said product fraction is crystallized.

48. A method as claimed in claim 1 including subjecting said feed solution to hydrogenation before said feed solution is fed into said first loop.

49. A method as claimed in claim 1 including hydrogenating said feed solution before said feed solution is fractionated in said first loop.

50. A method as claimed in claim 1 including subjecting said solution derived from said crystallization run-off to hydrogenation before said solution derived from said crystallization is fed into said second loop.

51. A method as claimed in claim 1 including hydrogenating said solution derived from said crystallization run-off before said solution derived from said crystallization is fractionated in said second loop.

52. A method as claimed in claim 1 including subjecting said product fraction to hydrogenation after said product fraction has exited said second loop.

53. A method as claimed in claim 1 including hydrogenating said product fraction after said product is recovered from said second loop.

54. A method as claimed in claim 1 including converting xylose to xylitol between said loops.

55. A method as claimed in claim 1 wherein said feed solution comprises components providing constituents forming part of two or more essentially complete dry solids (dry substance) separation profiles, said constituents comprising low migration rate constituents, intermediate migration rate constituents, and high migration rate constituents, said circulation phase comprising circulating at least part of the dry substances of one or more fractions in one or more loops, said essentially completed dry solids (dry substance) separation profiles being formed by the feed solution and the circulating dry substances, and said method simultaneously comprising two or more essentially complete dry solids (dry substance) separation profiles in one or more of said loops.

56. A method as claimed in claim 1 wherein said processing includes forming two or more separation profiles in one or more of said loops.

57. A method as claimed in claim 1 wherein:
each loop comprises one or several dry solids (dry substance) profiles; and
said dry solids (dry substance) profile(s) are circulated.

58. A method as claimed in claim 1 including at least two separation profiles in the same loop.

59. A method as claimed in claim 1 wherein:
one or several dry solids (dry substance) profiles are formed in said first loop from said feed solution; and
said dry solids (dry substance) profile(s) are recycled in said first loop.

60. A method as claimed in claim 1 wherein one or more of said loops is capable of simultaneously maintaining two or more separation profiles in the same loop.

61. A method as claimed in claim 1 wherein liquid present in said first loop comprises two or more dry solids (dry substance) profiles.

62. A method as claimed in claim 1 including advancing two or more dry solids (dry substance) profiles in said first loop before recovery of said product fraction.

63. A method as claimed in claim 1 wherein said first loop includes at least two simultaneously moving dry solids (dry substance) profiles.

64. A method as claimed in claim 1 wherein:
one or several dry solids (dry substance) profiles are formed in said second loop from said solution derived from said crystallization run-off; and
said dry solids (dry substance) profile(s) are recycled in said second loop.

65. A method as claimed in claim 1 wherein liquid present in said second loop comprises two or more dry solids (dry substance) profiles.

66. A method as claimed in claim 1 including advancing two or more dry solids (dry substance) profiles in said second loop before recovery of said product fraction.

67. A method as claimed in claim 1 wherein said second loop includes at least two simultaneously moving dry solids (dry substance) profiles.

68. A method for processing of molasses selected from the group consisting of beet molasses, cane molasses, biomass molasses, stillage, vinasse wood molasses, wheat molasses, barley molasses, corn molasses, and solutions derived from any of the preceding, comprising:

recovering at least one product during processing of molasses in two or more loops, each loop being separate than the other loop, and each loop comprising one or more chromatographic beds, columns, or parts thereof separate and distinct from the other loop, said loops comprising at least a first loop and a second loop;

said processing comprising at least one of the following phases: a feeding phase, an eluting phase and a recycling phase, wherein liquid present in each loop comprises a separate defined dry solids (dry substance) profile, and said dry solids (dry substance) profile is recycled in the recycling phase of the loop; said processing of molasses further including further comprising feeding a feed solution derived from said molasses into said first loop, fractionating said feed solution derived from said molasses in said first loop into at least one product fraction and at least one residual fraction by a chromatographic simulated moving bed process;

crystallizing said product fraction from said first loop;

feeding a liquid derived from crystallization run-off of the crystallization of said product fraction from said first loop into said second loop, and fractionating said liquid derived from said crystallization run-off in said second loop by chromatographic fractionation into at least one other product fractions and at least one other residual fraction; and said product fraction from said first loop comprises a greater percentage concentration by weight on a dry solids (dry substance) basis of said product than said feed solution comprising said molasses;

said product fraction from said second loop comprises a greater percentage concentration by weight on a dry solids (dry substance) basis of said product than said feed solution comprising said molasses; and said product fraction from said second loop comprises a greater concentration be weight on a dry solids (dry substance) basis of said product than said liquid derived from said crystallization run-off.

69. A method as claimed in claim 68 wherein said processing in said first loop comprises at least one or more of the following phases: one or more molasses feeding phase, one or more feeding phases of an eluent liquid, one or more recycling phase, and one or more recovery phase of at least one product.

70. A method as claimed in claim 68 wherein said processing in said second loop includes one or more feeding phases, circulation-phases, a feeding phases for eluent liquid, and product recovery phases.

71. A method as claimed in claim 68 wherein:
said product fractions are selected from the group consisting of sucrose fractions and xylose fractions; and
said product fraction is crystallized into a crystallized product selected from the group consisting of sucrose and xylose.

72. A method as claimed in claim 68 wherein:
said product fractions are selected from the group consisting of sucrose fractions and xylose fractions; and
said product fraction is crystallized into a crystallized product selected from the group consisting of, sucrose, and xylose, and xylitol and wherein xylose is converted into xylitol before the first loop.

73. A method as claimed in claim 68 wherein said processing comprises a plurality of recycling phases.

74. A method as claimed in claim 68 wherein said processing comprises five or 20 steps in a sequence which is repeated until equilibrium is essentially achieved.

75. A method as claimed in claim 68 wherein said sequence is repeated five to seven times in order to reach an equilibrium in the system, and the method is continued essentially in the state of equilibrium.

76. A method as claimed in claim 68 wherein the system comprises three to twenty-four chromatographic beds.

77. A method as claimed in claim 68 wherein each loop comprises a series of columns containing a cation exchange resin.

78. A method as claimed in claim 68 wherein a strongly acid cation exchange resin comprises said beds.

79. A method as claimed in claim 78 wherein said strongly acid cation exchange resin is in monovalent form or in divalent form.

80. A method as claimed in claim 79 wherein said monovalent form is selected from the group consisting of: a) sodium, potassium and mixtures thereof, or b) magnesium, calcium and mixtures thereof.

81. A method as claimed in claim 68 wherein the flow rate of the liquid in the beds is 0.5 to 20 $m^3/h/m^2$.

82. A method as claimed in claim 68 wherein the eluent comprises water and temperature of the feed solution and eluent water ranges from about 20 to about 95 degrees C.

83. A method as claimed in claim 68 wherein the feed solution dry solids (dry substance) content is 20% to 80% by weight.

84. A method as claimed in claim 68 wherein the flow rate in the beds is 0.5 to 10 $m^3/h/m^2$.

85. A method as claimed in claim 68 wherein the feed solution is 20% to 65% by weight on a dry solids (dry substance) basis.

86. A method as claimed in claim 68 wherein each loop comprises one to twelve chromatographic beds.

87. A method as claimed in claim 68 wherein the temperature of the feed and eluent is about 40 to about 95 degrees C.

88. A method as claimed in claim 68 wherein the simulated moving bed process in said first loop is selected from the group consisting of a continuous simulated moving bed process and a sequential moving bed process.

89. A method as claimed in claim 68 wherein the chromatographic fractionation in said second loop comprises a batch method.

90. A method as claimed in claim 68 wherein the chromatographic fractionation in said second loop is selected from the group consisting of a continuous simulated moving bed process and a sequential simulated moving bed process.

91. A method as claimed in claim 68 wherein said feed solution of said first loop is also derived from said recycle fraction.

92. A method as claimed in claim 68 wherein:
a betaine fraction is recovered from one of said loops; and
said betaine fraction comprises a greater percentage concentration of betaine by weight on a dry solids basis than feed solution.

93. A method as claimed in claim 92 wherein said betaine fraction is withdrawn from said second loop.

94. A method as claimed in claim 68 wherein said first loop is connected in series to said second loop.

95. A method as claimed in claim 68 wherein said crystallizing occurs between the first and second loops.

96. A method as claimed in claim 68 wherein said loops are selected from the group consisting of closed loops, open loops, and combinations thereof.

97. A method as claimed in claim 68 wherein said columns comprise one or more partial packing material beds.

98. A method as claimed in claim 68 wherein during said process, said loops are in the same or different phases.

99. A method as claimed in claim 68 wherein simultaneous feed, eluent feed and recycling phases are used in the same or different loops or beds.

100. A method as claimed in claim 68 where said feed solution comprises 20% to 80% beet molasses by weight on a dry solids basis.

101. A method as claimed in claim 68, wherein said feed solution is heated to a temperature ranging from about 40 to about 95 degrees C. before being fed to said first loop.

102. A method as claimed in claim 68 wherein said wood molasses and said biomass molasses comprise xylan-derived material derived from vegetable material.

103. A method as claimed in claim 68 wherein said xylan-containing vegetable matter derived from vegetable material is selected from the group consisting of: wood, wood chips, saw dust, hardwood, birch, aspen, beech, eucalyptus, poplar, alder, alm, softwood, grain, wheat, corn, barley, rice, oats, particulates of grain, straw, stems, hulls, husks, fiber, corn husks, barley husks, oat husks, rice hulls, corn fiber, corn stems, corn cobs, bagasse, almond shells, coconut shells, cotton seed bran and cotton seed-hulls.

104. A method as claimed in claim 68 wherein said biomass molasses comprises biomass hydrolysates derived from biomass.

105. A method as claimed in claim 104 wherein said biomass hydrolysates are obtained by a process selected from the group consisting of: direct acid hydrolysis of said biomass, enzymatic prehydrolysate of molasses obtained from steam exploded biomass or from by acetic acid or steam hydrolysed biomass, acid hydrolysis of prehydrolysate obtained from steam exploded biomass or from acetic acid or steam hydrolysed biomass, and a sulphite pulping process.

106. A method as claimed in claim 104 wherein said wood molasses and said biomass hydrolysates are selected from the group consisting of: sulphite cooking liquor, spent sulphite pulping liquor, acid spent sulphite liquor, spent liquor from hardwood pulping, spent liquor from softwood pulping before hexoses are removed, spent liquor from softwood pulping after hexoses are removed, spent liquor from digestion of said biomass, spent liquor from hydrolysis of said biomass, spent liquor from solvent-based pulping, spent liquor from ethanol-based pulping, mother liquor from crystallization of xylose, diluted runoff of xylose crystallization of sulphite spent pulping liquor, waste solution from the paper industry, and waste solution from the pulping industry.

107. A method as claimed in claim 68 wherein said molasses comprises a xylose solution.

108. A method as claimed in claim 68 wherein said feed solution is pretreated before being fed to said first loop in at least one pretreatment process selected from the group consisting of: filtering, ultrafiltration, heating, chromatography, concentrating, evaporation, neutralization, pH adjustment, dilution, softening by carbonation and ion exchange.

109. A method as claimed in claim 68 wherein said feed solution comprises one or more compounds selected from the group consisting of: sucrose, betaine, carbohydrates, sugar alcohols, ionic substances, monosaccharides, disaccharides, pentoses, as xylose, and arabinose, hexoses as glucose, galactose, rhanmose and mannose, carboxylic acids as xylonic acid, lignosulphonates, and oligosacchadries.

110. A method as in claim 68 wherein said solution derived from said crystallization run-off is fed to said second loop after being treated in at least one treatment process selected from the group consisting of: filtering, ultrafiltration, heating, concentrating, evaporation, neutralization, pH adjustment, dilution, softening by carbonation and ion exchange.

111. A method as claimed in claim 68 wherein said fractions are selected from the group consisting of one or more: sucrose fractions, betaine fractions, xylose fractions, xylonic acid fraction, residual fractions, and recycle fractions.

112. A method as claimed in claim 68 wherein said fractions comprise one or more compounds selected from the group consisting of: sucrose, betaine, xylose, glucose, galactose, rhamnose, mannose, arabinose and xylonic acid.

113. A method as claimed in claim 68 wherein said solutions from said molasses are selected from the group consisting of: raw juice, diffusion juice, thin juice, thick juice, dilute juice, residual juice, molasses-containing liquid, and molasses-containing juice.

114. A method as claimed in claim 68 wherein said crystallization run-off comprises xylose crystallization run-off, and said xylose-crystallization run-off comprises mother liquor from the crystallization of said product fraction.

115. A method as claimed in claim 68 wherein each loop contains at least one type of resin.

116. A method as claimed in claim 115 wherein composition of the resin in the first loop is the same as the resin in the second loop.

117. A method as claimed in claim 115 wherein composition of the resin in the first loop is different than the resin in the second loop.

118. A method as claimed in claim 115 wherein the resin of the first loop has a different degree of crosslinking than the resin of the second loop.

119. A method as claimed in claim 115 wherein the resin of the second loop has lower crosslinking than the resin of the first loop.

120. A method as claimed in claim 115 wherein one of the resins in one of said loops is in monovalent form and one of the resins in another one of said loops is in divalent form.

121. A method as claimed in claim 115 wherein the resins of the loops have similar or different particles sizes.

122. A method as claimed in claim 68 wherein the loops have similar flow rates.

123. A method as claimed in claim 68 wherein the first and second loops have different flow rates.

124. A method as claimed in claim 68 wherein the pH of the feed solution in the first loop is the same or different than the pH of the solution in the second loop.

125. A method as claimed in claim 68 wherein said first loop is operated as a continuous simulated moving bed (SMB) at high capacity and low dilution and recover products with high yield and purity in the second loop using sequential simulated moving bed method.

126. A method as claimed in claim 68 wherein said product fraction from said second loop is crystallized.

127. A method as claimed in claim 68 wherein at least one of said loop is operated as a sequential simulated moving bed (SMB) to recover products contained in minor amount in solution in said loop.

128. A method as claimed in claim 68 wherein:

one of said loops is operated as a continuous simulated moving bed (SMB); and
another one of said loops is operated as a sequential simulated moving bed (SMB).

129. A method as claimed in claim 128 wherein:

said first loop is operated as a continuous simulated moving bed (SMB); and
said second loop is operated as a sequential simulated moving bed (SMB).

130. A method as claimed in claim 128 wherein said product fractions from said one loop and from said another one of said loops are crystallized.

131. A method as claimed in claim 68 including subjecting said feed solution to hydrogenation before said feed solution is fed into said first loop.

132. A method as claimed in claim 68 including hydrogenating said feed solution before said feed solution is fractionated in said first loop.

133. A method as claimed in claim 68 including subjecting said liquid derived from crystallization run-off of the crystallization of said product fraction forms said first loop to hydrogenation before said liquid is fed into said second loop.

134. A method as claimed in claim 68 including hydrogenating said liquid derived from crystallization run-off of said product fraction from said first loop before said liquid is fractionated in said second loop.

135. A method as claimed in claim 68 including subjecting said product fraction from said second loop to hydrogenation after said product fraction from said second loop exists said second loop.

136. A method as claimed in claim 68 including hydrogenating said product fraction of said second loop.

137. A method as claimed in claim 68 including converting xylose to xylitol between said loops.

138. A method as claimed in claim 68 wherein said feed solution comprises components providing constituents forming part of two or more separation profiles comprising essentially complete dry solids (dry substance) profiles, said constituents comprising low migration rate constituents, intermediate migration rate constituents, and high migration rate constituents, said recycling phase comprising recycling at least part of the dry substances of one or more fractions in one or more loops, said separation profiles being formed by the feed solution and the circulating dry substances, and said method simultaneously comprising two or more separation profiles in at least one of said loops.

139. A method as claimed in claim 68 wherein said processing includes forming two or more separation profiles in one or more of said loops.

140. A method as claimed in claim 68 wherein:

each loop comprises one or several dry solids (dry substance) profiles; and
said dry solids (dry substance) profiles are recycled.

141. A method as claimed in claim 68 including at least two separation profiles in the same loop.

142. A method as claimed in claim 68 wherein:

one or several dry solids (dry substance) profiles are formed in said first loop from said feed solution; and
said dry solids (dry substance) profile(s) are recycled in said first loop.

143. A method as claimed in claim 68 wherein one or more loops is capable of simultaneously maintaining two or more separation profiles in the same loop.

144. A method as claimed in claim 68 wherein liquid present in said first loop comprises two or more dry solids (dry substance) profiles.

145. A method as claimed in claim 68 including moving two or more dry solids (dry substance) profiles through said first loop before said product fraction in said first loop is recovered.

146. A method as claimed in claim 68 wherein said first loop includes at least two simultaneously moving dry solids (dry substance) profiles.

147. A method as claimed in claim 68 wherein:
- one or several dry solids (dry substance) profiles are formed in said second loop from said liquid derived from said crystallization run-off; and
- said dry solids (dry substance) profiles are recycled in said second loop.

148. A method as claimed in claim 68 wherein liquid present in said second loop comprises two or more dry solids (dry substance) profiles.

149. A method as claimed in claim 68 including moving two or more dry solids (dry substance) profiles through said second loop before said product fraction from said second loop is recovered.

150. A method as claimed in claim 68 wherein said second loop includes at least two simultaneously moving dry solids (dry substance) profiles.

* * * * *